(12) United States Patent
Lim

(10) Patent No.: US 7,621,836 B2
(45) Date of Patent: Nov. 24, 2009

(54) HYDRAULIC CONTROL SYSTEM OF 7-SPEED AUTOMATIC TRANSMISSION FOR VEHICLES

(75) Inventor: Ki Been Lim, Yongin (KR)

(73) Assignee: Hyundai Motor Company, Seoul (KR)

( * ) Notice: Subject to any disclaimer, the term of this patent is extended or adjusted under 35 U.S.C. 154(b) by 577 days.

(21) Appl. No.: 11/648,739

(22) Filed: Dec. 29, 2006

(65) Prior Publication Data

US 2008/0020886 A1 Jan. 24, 2008

(30) Foreign Application Priority Data

Jul. 19, 2006 (KR) ...................... 10-2006-0067647

(51) Int. Cl.
*F16H 61/06* (2006.01)

(52) U.S. Cl. .................... 475/123; 475/128; 477/131

(58) Field of Classification Search .................. 475/123, 475/128; 477/131
See application file for complete search history.

(56) References Cited

U.S. PATENT DOCUMENTS

| | | | | |
|---|---|---|---|---|
| 5,667,453 A * | 9/1997 | Jang et al. | .................... | 477/131 |
| 7,344,466 B2 * | 3/2008 | Park | .......................... | 475/128 |

* cited by examiner

*Primary Examiner*—David D Le
*Assistant Examiner*—Derek D Knight
(74) *Attorney, Agent, or Firm*—Morgan, Lewis & Bockius LLP

(57) ABSTRACT

A hydraulic control system applicable to a power train of a seven-speed automatic transmission for a vehicle having six friction members. Enhanced overall performance is achieved by minimization of shift shock and an enhancement of fuel consumption as a consequence of achieving precise and effective control.

22 Claims, 8 Drawing Sheets

FIG.2

| shift speed | C1 | C2 | C3 | C4 | B1 | B2 | F1 |
|---|---|---|---|---|---|---|---|
| 1ST | ● | | | | ○ | | ● |
| 2ND | ● | | | | | ● | |
| 3RD | ● | ● | | | | | |
| 4TH | ● | | ● | | | | |
| 5TH | ● | | | ● | | | |
| 6TH | | | ● | ● | | | |
| 7TH | | | | ● | | ● | |
| L | ● | | | | ● | | |
| REV | | | ● | | ● | | |

HYDRAULIC CONTROL SYSTEM OF 7-SPEED AUTOMATIC TRANSMISSION FOR VEHICLES

CROSS-REFERENCE TO RELATED APPLICATION

This application claims priority to and the benefit of Korean Patent Application No. 10-2006-0067647 filed in the Korean Intellectual Property Office on Jul. 19, 2006, the entire contents of which are incorporated herein by reference.

BACKGROUND OF THE INVENTION (a) Field of the Invention

The present invention relates to a hydraulic control system for a seven-speed automatic transmission for a vehicle.

(b) Description of the Related Art

Typical automatic transmissions include a torque converter and a power train with a multiple speed gear mechanism connected to the torque converter. In addition, a hydraulic control system is provided for the automatic transmission for selectively operating at least one operational element included in the power train according to a running state of the vehicle.

One such automatic transmission includes a power train and a hydraulic control system. The power train includes a compound planetary gear set, formed by combining at least two simple planetary gear sets to achieve the required multiple speeds, and a plurality of friction members. The hydraulic control system selectively operates the friction members of the power train according to driving conditions.

A variety of such power trains and hydraulic control systems have been developed by vehicle manufacturers according to their own schemes. Currently, four-speed automatic transmissions are most often found on the market. However, five-speed and six-speed automatic transmissions have also been realized for enhancement of performance of power transmission and for enhanced fuel mileage of a vehicle.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiment of the present invention provide a hydraulic control system applicable to a power train of a seven-speed automatic transmission for a vehicle having six friction members, thereby obtaining an enhanced overall performance by achieving minimization of shift shock and enhancement of fuel consumption as a consequence of achieving precise and effective control.

A hydraulic control system of a seven-speed automatic transmission for a vehicle according to an exemplary embodiment of the present invention may include: a line pressure control portion for controlling a hydraulic pressure supplied from a hydraulic pump to be stable; a launch control portion for multiplying a torque of a torque converter and controlling engagement and release of a damper clutch; a pressure reduction control portion for reducing a line pressure supplied from the line pressure control portion by a first reducing valve so as to supply a control pressure to pressure switches and first and second on/off solenoid valves used for each frictional element, and supplying a control pressure of a second reducing valve to proportional control solenoid valves as a control pressure; a manual shift control portion for controlling a hydraulic line in accordance with a manual shifting; a first clutch control portion for controlling a forward range pressure according to a control of a first proportional control solenoid valve so as to supply the forward range pressure to a first clutch at first, second, third, fourth, and fifth speeds and a low L range; a second clutch control portion for supplying the forward range pressure to a second clutch according to a control of a second proportional control solenoid valve at the third speed; a third clutch control portion for controlling the line pressure according to a control of a third proportional control solenoid valve so as to supply the line pressure to a third clutch at the fourth speed and a sixth speed; a fourth clutch and a first brake control portion for controlling the forward range pressure according to a control of a fourth proportional control solenoid valve so as to supply the forward range pressure to a fourth clutch at the fifth speed, the sixth speed, and a seventh speed, and for supplying a control pressure of the fourth proportional control solenoid valve to a first brake at the low L range; and a second brake control portion for supplying the forward range pressure to a second brake according to a fifth proportional control solenoid valve at the second and seventh speeds.

The first, third, and fourth proportional control solenoid valves may be duty control valves outputting a minimum hydraulic pressure in a turned-on state, and the second and fifth proportional control solenoid valves may be duty control valves outputting a minimum hydraulic pressure in a turned-off state.

The first clutch control portion may include: a first clutch side pressure control valve integrally formed with the first proportional control solenoid valve; and a first clutch side pressure switching valve controlling the hydraulic line according to a control pressure of the first proportional control solenoid valve and a control pressure of the first reducing valve.

The first clutch side pressure control valve integrally formed with the first proportional control solenoid valve may include: a valve body including a first port receiving a control pressure of the first proportional control solenoid valve, a second port receiving the forward range pressure from a manual valve, a third port supplying the hydraulic pressure received through the second port to the first clutch, a fourth port exhausting the hydraulic pressure supplied to the first clutch, and a fifth port receiving, when the first proportional control solenoid valve is turned on, the hydraulic pressure supplied to the first clutch; and a valve spool including a first land receiving the control pressure supplied through the first port, a second land selectively closing the fourth port, and a third land, cooperatively with the second land, selectively enabling communication of the second and third ports, wherein an elastic member is disposed between the third land and the valve body.

The first clutch side pressure switching valve may include: a valve body including a first port receiving the control pressure of the first reducing valve, a second port formed at an opposite side of the first port and receiving the control pressure of the first proportional control solenoid valve, a third port partially receiving the hydraulic pressure supplied from the first clutch side pressure control valve to the first clutch, a fourth port connected to the fifth port of the first clutch side pressure control valve, and a fifth port selectively communicating with the fourth port; and a valve spool including a first land receiving the control pressure from the first port and closing the fifth port, and a second land receiving the control pressure supplied through the second port, selectively closing the third port, and selectively enabling communication of the fourth and fifth ports, cooperatively with the first land, wherein an elastic member is disposed between the second land and the valve body.

The second clutch control portion may include: a first clutch side pressure control valve integrally formed with the second proportional control solenoid valve; and a second clutch side pressure switching valve controlling the hydraulic line according to the control pressure of the second proportional control solenoid valve and the control pressure of the first reducing valve.

The second clutch side pressure control valve integrally formed with the second proportional control solenoid valve may include: a valve body including a first port receiving the control pressure of the second proportional control solenoid valve, a second port receiving the forward range pressure from the manual valve, a third port supplying the hydraulic pressure received through the second port to the second clutch, a fourth port exhausting the hydraulic pressure supplied to the second clutch, and a fifth port receiving, when the second proportional control solenoid valve is turned off, the hydraulic pressure supplied to the second clutch; and a valve spool including a first land receiving the control pressure supplied through the first port, a second land selectively closing the fourth port, and a third land, cooperatively with the second land, selectively enabling communication of the second and third ports, wherein an elastic member is disposed between the third land and the valve body.

The second clutch side pressure switching valve may include: a valve body including a first port receiving the control pressure of the first reducing valve, a second port formed at an opposite side of the first port and receiving the control pressure of the second proportional control solenoid valve, a third port partially receiving the hydraulic pressure supplied from the second clutch side pressure control valve to the second clutch, a fourth port connected with the fifth port of the second clutch side pressure control valve, and a fifth port selectively communicating with the fourth port; and a valve spool including a first land receiving the control pressure supplied through the first port and closing the fifth port, and a second land selectively closing the third port and, cooperatively with the first land, selectively enabling communication of the fourth and fifth ports by the control pressure supplied through the second port, wherein an elastic member is disposed between the second land and the valve body.

The third clutch control portion may include: a third clutch side pressure control valve integrally formed with the third proportional control solenoid valve; a third clutch side pressure switching valve controlling the hydraulic line according to the control pressure of the third proportional control solenoid valve and the control pressure of the first reducing valve; and a first switching valve controlled by the second on/off solenoid valve and a reverse range pressure of the manual valve.

The third clutch side pressure control valve integrally formed with the third proportional control solenoid valve may include: a valve body including a first port receiving the control pressure of the third proportional control solenoid valve, a second port receiving the forward range pressure from the first switching valve, a third port supplying the hydraulic pressure supplied through the second port to the third clutch, a fourth port exhausting the hydraulic pressure supplied to the third clutch, a fifth port partially receiving the hydraulic pressure supplied to the third clutch when the third proportional control solenoid valve is turned on; and a valve spool including a first land receiving the control pressure supplied through the first port, a second land selectively enabling communication of the second and third ports, and a third land selectively closing the fourth port, wherein an elastic member is disposed between the third land and the valve body.

The third clutch side pressure switching valve may include: a valve body including a first port receiving the control pressure of the first reducing valve, a second port formed at an opposite side of the first port and receiving the control pressure of the third proportional control solenoid valve, a third port partially receiving the hydraulic pressure supplied from the third clutch side pressure control valve to the third clutch, a fourth port connected with the fifth port of the third clutch side pressure control valve, a fifth port selectively communicating with the fourth port and exhausting the hydraulic pressure of the fourth port, a sixth port receiving the forward range pressure of the manual valve, a seventh port selectively supplying the forward range pressure supplied through the sixth port to the second brake side pressure control valve, and an eighth port selectively communicating with the seventh port and exhausting the hydraulic pressure of the seventh port; and a valve spool including a first land receiving the control pressure supplied through the first port and closing the eighth port, a second land, cooperatively with the first land, enabling communication of the seventh and sixth ports or the seventh and eighth ports, and a third land selectively closing the third port and, cooperatively with the second land, selectively enabling communication of the fourth and fifth ports by the control pressure supplied through the second port, wherein an elastic member is disposed between the third land and the valve body.

The first switching valve may be controlled by the control pressure of the second on/off solenoid valve and the reverse range pressure of the manual valve and may supply the forward range pressure to the third proportional control solenoid valve or supply the reverse range pressure to the third switching valve.

The first switching valve may include: a valve body including a first port receiving the control pressure of the second on/off solenoid valve, a second port receiving the reverse range pressure as its control pressure, a third port receiving the reverse range pressure, a fourth port supplying the hydraulic pressure supplied through the third port to the third switching valve, a fifth port exhausting the hydraulic pressure supplied through the fourth port, a sixth port receiving the forward range pressure, a seventh port supplying the hydraulic pressure supplied through the sixth port to the third clutch side hydraulic pressure control valve, and a eighth port exhausting the hydraulic pressure supplied through the seventh port; and a valve spool including a first land receiving the control pressure supplied through the first port, a second land receiving the control pressure supplied through the second port, a third land, cooperatively with the second land, selectively enabling communication of the fourth and third ports or the fourth and fifth ports, a fourth land, cooperatively with the third land, selectively enabling communication of the seventh and sixth ports or the seventh and eighth ports, wherein an elastic member is disposed between the fourth land and the valve body.

The fourth clutch and first brake control portion may include: a fourth clutch side pressure control valve integrally formed with a fourth proportional control solenoid valve; a fourth clutch side pressure switching valve controlling the hydraulic line according to the control pressure of the fourth proportional control solenoid valve and the control pressure of the first reducing valve; a second switching valve controlling the hydraulic line and selectively supplying the hydraulic pressure supplied from the fourth proportional control solenoid valve to the fourth clutch and the first brake according to the control pressure of the first on/off solenoid valve; and a third switching valve supplying the hydraulic pressure supplied from the first and second switching valves to the first brake according to the control pressure supplied from the first switching valve.

The fourth clutch side pressure control valve integrally formed with the fourth proportional control solenoid valve may include: a valve body including a first port receiving the control pressure of the fourth proportional control solenoid valve, a second port receiving a forward range pressure from the manual valve, a third port supplying the hydraulic pressure supplied through the second port to the fourth clutch side pressure switching valve and the second switching valve, a fourth port exhausting the hydraulic pressure supplied through the third port, a fifth port partially receiving the hydraulic pressure supplied to the fourth clutch side pressure switching valve when the fourth proportional control solenoid valve is turned on; and a valve spool including a first land receiving the control pressure supplied through the first port, a second land selectively closing the second port, and a third land, cooperatively with the second land, selectively enabling communication of the second and third ports, wherein an elastic member is disposed between the third land and the valve body.

The fourth clutch side pressure switching valve may include: a valve body including a first port receiving the control pressure of the first reducing valve, a second port formed at an opposite side of the first port and receiving the control pressure of the fourth proportional control solenoid valve, a third port partially receiving the hydraulic pressure supplied from the fourth clutch side pressure control valve to the second switching valve, a fourth port connected with the fifth port of the fourth clutch side pressure control valve, a fifth port selectively communicating with the fourth port and exhausting the hydraulic pressure of the fourth port, a sixth port receiving the control pressure from the fifth proportional control solenoid valve, and a seventh port selectively supplying the hydraulic pressure supplied through the sixth port to the fifth proportional control solenoid valve; and a valve spool including a first land receiving the control pressure supplied through the first port and closing the sixth port, a second land, cooperatively with the first land, selectively enabling communication of the seventh and fifth ports or the seventh and sixth ports, and a third land selectively closing the third port and, cooperatively with the second land, selectively enabling communication of the fourth and fifth ports by the control pressure supplied through the second port, wherein an elastic member is disposed between the third land and the valve body.

The second switching valve may supply the forward range pressure to the fourth clutch or supply the forward range pressure to the first brake through the third switching valve according to the control pressure of the first on/off solenoid valve.

The second switching valve may include: a valve body including a first port receiving the control pressure of the first on/off solenoid valve, a second port receiving the forward range pressure from the fourth clutch side pressure control valve, a third port supplying the hydraulic pressure supplied through the second port to the fourth clutch, a fourth port supplying the hydraulic pressure supplied through the second port to the third switching valve, a fifth port exhausting the hydraulic pressure supplied through the third port, a sixth port exhausting the hydraulic pressure supplied to the fourth port, and a seventh port partially receiving the hydraulic pressure supplied to the third port; and a valve spool including a first land receiving the control pressure supplied through the first port, a second land, cooperatively with the first land, selectively enabling communication of the fourth and second ports or the fourth and sixth ports, and a third land, cooperatively with the second land, selectively enabling communication of the third and second ports or the third and fifth ports, wherein an elastic member is disposed between the third land and the valve body.

The third switching valve may include: a valve body including a first port receiving the reverse range pressure from the first switching valve as its control pressure, a second port receiving the forward range pressure from the second switching valve, a third port receiving the reverse range pressure from the first switching valve, and a fourth port supplying the hydraulic pressure supplied from the second and third ports to the first brake; and a valve spool including a first land receiving the control pressure supplied through the first port, and a second land, cooperatively with the first land, selectively enabling communication of the fourth and second ports or the fourth and third ports, wherein an elastic member is disposed between the second land and the valve body.

The second brake control portion may include: a second brake side pressure control valve integrally formed with a fifth proportional control solenoid valve; and a second brake side pressure switching valve controlling the hydraulic line according to the control pressure of the fifth proportional control solenoid valve and the control pressure of the first reducing valve.

The second brake side pressure control valve integrally formed with the fifth proportional control solenoid valve may include: a valve body including a first port receiving the control pressure of the fifth proportional control solenoid valve, a second port receiving the hydraulic pressure from the third clutch side pressure switching valve, a third port receiving the forward range pressure from the third clutch side pressure switching valve, a fourth port supplying the hydraulic pressure supplied through the third port to the second brake, a fifth port exhausting the hydraulic pressure supplied to the fourth port, and a sixth port partially supplying the hydraulic pressure supplied to the second brake when the fifth proportional control solenoid valve is turned off; and a valve spool including a first land receiving the control pressure supplied through the first port, a second land receiving the control pressure supplied through the second port, a third land, cooperatively with the second land, selectively enabling communication of the fourth and third ports or the fourth and fifth ports, wherein an elastic member is disposed between the third land and the valve body.

The second brake side pressure switching valve may include: a valve body including a first port receiving the control pressure of the first reducing valve, a second port formed with an opposite side of the first port and receiving the control pressure of the fifth proportional control solenoid valve, a third port partially receiving the hydraulic pressure supplied from the second brake side pressure control valve to the second brake, a fourth port connected to the sixth port of the second brake side pressure control valve, a fifth port selectively communicating with the fourth port and exhausting the hydraulic pressure of the fourth port, a sixth port receiving the line pressure from a line pressure line, a seventh port selectively supplying the line pressure of the sixth port to the first switching valve, and an eighth port selectively communicating with the seventh port and exhausting the hydraulic pressure of the seventh port; and a valve spool including a first land receiving the control pressure supplied through the first port and closing the eighth port, a second land, cooperatively with the first land, selectively enabling communication of the seventh and sixth ports or the seventh and eighth ports, and a third land, cooperatively with the second land, selectively closing the third port and selectively enabling communication of the fourth and third ports or the fourth and fifth ports by the control pressure of the second port, wherein an elastic member is disposed between the third land and the valve body.

BRIEF DESCRIPTION OF THE DRAWINGS

FIG. 2 is an operational chart for frictional members of a power train shown in FIG. 1.

DETAILED DESCRIPTION OF THE EMBODIMENT

Exemplary embodiments of the present invention will hereinafter be described in detail with reference to the accompanying drawings.

Figure 1:
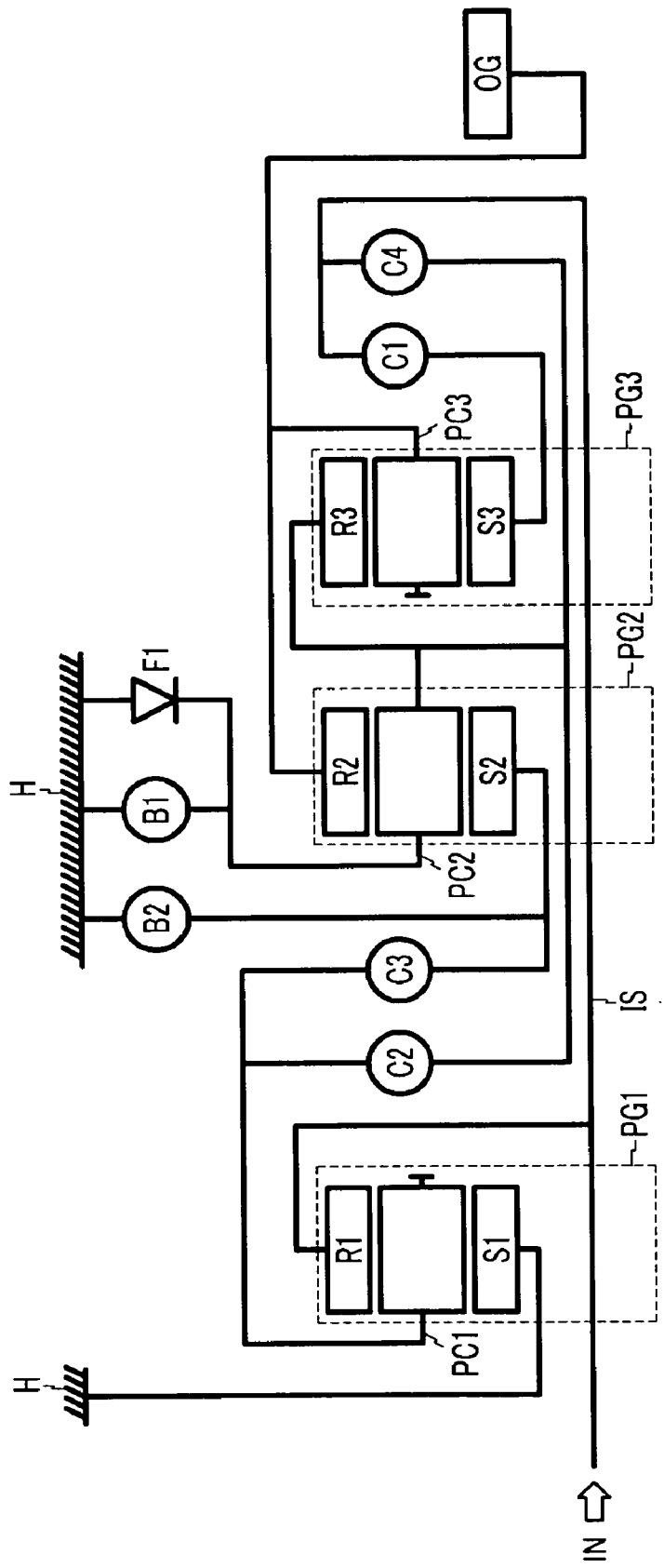
FIG. 1 is a schematic diagram of an exemplary power train that may be operated by a hydraulic control system according to an exemplary embodiment of the present invention.

FIG. 1 illustrates an exemplary seven-speed power train that may be operated by a hydraulic control system according to an exemplary embodiment of the present invention. The power train includes first, second, and third planetary gear sets PG1, PG2, and PG3 of single pinion planetary gear sets, first, second, third, and fourth clutches C1, C2, C3, and C4, and first and second brakes B1 and B2.

A first sun gear S1 of the first planetary gear set PG1 always acts as a reaction element by being fixedly connected to a transmission housing H, and a first ring gear R1 always acts as an input element by being directly connected to an input shaft IS.

In addition, a first planet carrier PC1 of the first planetary gear set PG1 acts as an output element of the first planetary gear set PG1. The first planet carrier PC1 is variably connected to at least one of a fixedly connected second planet carrier PC2 of the second planetary gear set PG2 and a third ring gear R3 of the third planetary gear set PG3 via the second clutch C2. In addition, the first planet carrier PC1 is variably connected to a second sun gear S2 of the second planetary gear set PG2 via the third clutch C3.

In addition, the second planet carrier PC2 of the second planetary gear set PG2 is variably connected to the transmission housing H via the first brake B1 and a one-way clutch F1 disposed in parallel with each other. The second sun gear S2 is variably connected to the transmission housing H via the second brake B2.

In addition, a third sun gear S3 of the third planetary gear set PG3 is variably connected to the input shaft IS via the first clutch C1. At least one of the fixedly connected second planet carrier PC2 of the second planetary gear set PG2 and the third ring gear R3 of the third planetary gear set PG3 is variably connected to the input shaft IS via the fourth clutch C4. At least one of the fixedly connected third planet carrier PC3 and a second ring gear R2 of the second planetary gear set PG2 always acts as an output element by being fixedly connected to an output gear OG.

Such a structured power train may be operated according to the operational chart shown in FIG. 2, to achieve seven forward speeds and one reverse speed. That is, the first clutch C1 and the one-way clutch F1 are operated for the first forward speed, the first clutch C1 and the second brake B2 are operated for the second forward speed, the first and second clutches C1 and C2 are operated for the third forward speed, and the first and third clutches C1 and C3 are operated for the fourth forward speed. The first and fourth clutches C1 and C4 are operated for the fifth forward speed, the third and fourth clutches C3 and C4 are operated for the sixth forward speed, the fourth clutch C4 and the second brake B2 are operated for the seventh forward speed, and the third clutch C3 and the first brake B1 are operated for the reverse speed.

A shifting operation formed by operating the frictional elements according to the operational chart shown in FIG. 2 will be apparent to a person of an ordinary skill in the art and thus will not be described in further detail.

Hereinafter, a hydraulic control system for operating such a power train will be described.

In general, the above described power train is merely illustrative of one exemplary of a power train with which the present invention may be utilized. Persons of ordinary skill in the art will recognize the applicability of the present invention to many different power trains based on the headings set forth herein.

Figure 3:
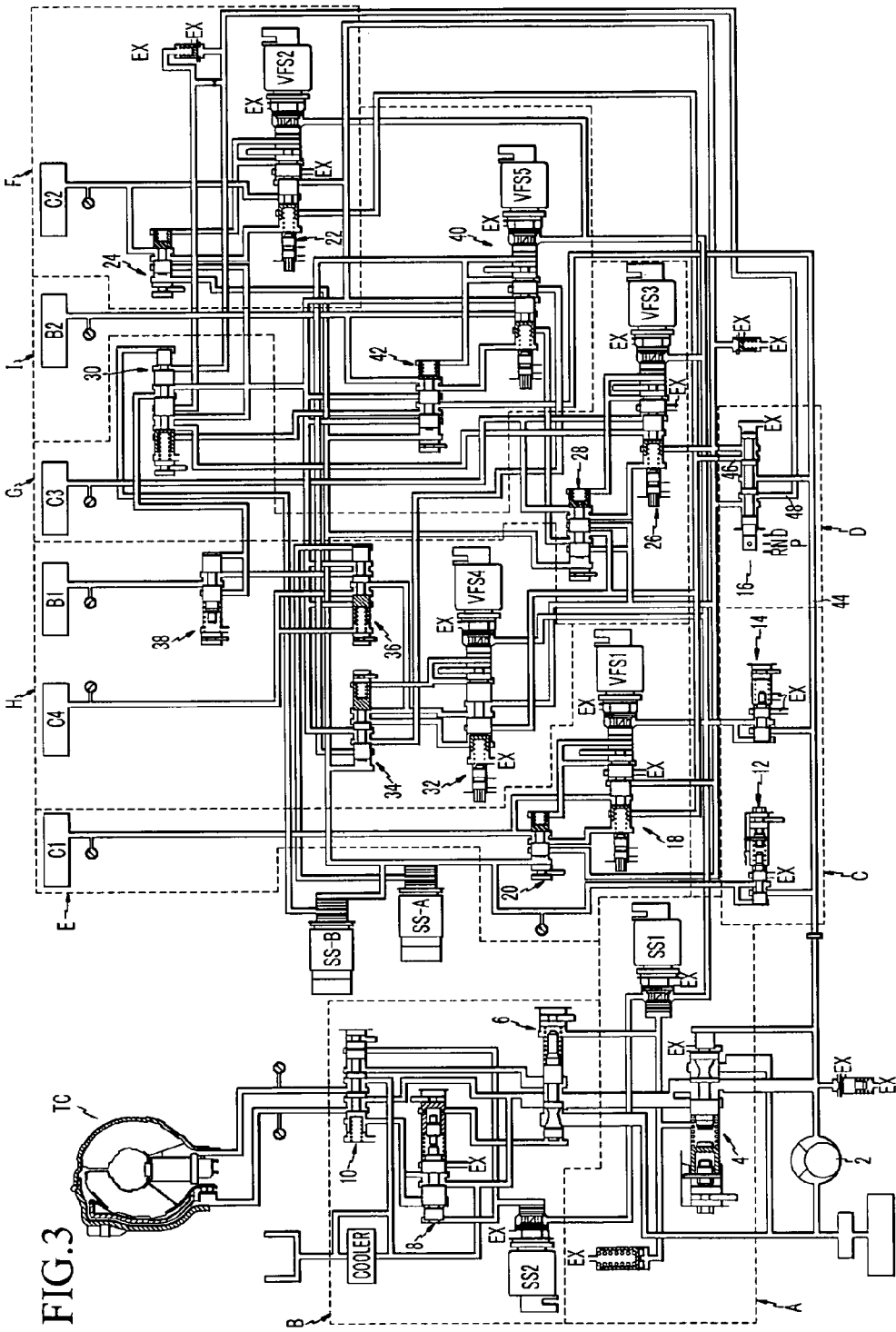
FIG. 3 is a schematic diagram of a hydraulic control system according to an exemplary embodiment of the present invention.

As shown in FIG. 3, a hydraulic control system according to an exemplary embodiment of the present invention includes a line pressure control portion A, a launch control portion B, a pressure reduction control portion C, a manual shift control portion D, a first clutch control portion E, a second clutch control portion F, a third clutch control portion G, a first brake and fourth clutch control portion H, and a second brake control portion I so as to control supply and release of hydraulic pressure to the friction members C1, C2, C3, C4, B1, and B2.

The line pressure control portion A and the launch control portion B may be formed according to a conventional scheme. According to an exemplary embodiment of the present invention, the line pressure control portion A includes a line regulator valve 4 and a proportional control solenoid valve SS1 controlling the same. The hydraulic pressure supplied from a hydraulic pump 2 may be controlled to be stable and a line pressure may be varied according to driving conditions. Therefore, fuel consumption of a vehicle may be enhanced.

In addition, the launch control portion B includes a torque converter control valve 6, a damper clutch control valve 8, a proportional control solenoid valve SS2, and a lock-up switching valve 10. The torque converter control valve 6 utilizes a torque multiplication effect of a torque converter TC under acceleration and reduces the line pressure in order to properly control a damper clutch for an enhancement of fuel consumption at high speed. The damper clutch control valve 8 controls engagement and release of the damper clutch. The proportional control solenoid valve SS2 controls the damper clutch control valve 8 according to an electrical signal of a transmission control unit TCU.

In addition, the pressure reduction control portion C includes a first reducing valve 12 and a second reducing valve 14. The first reducing valve 12 reduces the hydraulic pressure supplied from the line regulator valve 4 and then supplies the reduced pressure to pressure switching valves and first and second on/off solenoid valves SS-A and SS-B for use in each frictional element as a control pressure. The second reducing valve 14 reduces the hydraulic pressure supplied from the line regulator valve 4 and then supplies the reduced pressure to respective proportional control solenoid valves VFS1, VFS2, VFS3, VFS4, VFS5, S1, and S2 as their control pressures.

The manual shift control portion D includes a manual valve 16 that enables conversion of hydraulic lines according to a manual shifting.

The first clutch control portion E includes a first proportional control solenoid valve VFS1, a first clutch side pressure control valve 18, and a first clutch side pressure switching valve 20. The first clutch side pressure control valve 18 is integrally formed with the first proportional control solenoid valve VFS1. The first clutch side pressure switching valve 20 controls the hydraulic line according to the control pressure of the first proportional control solenoid valve VFS1 and the control pressure of the first reducing valve 12.

The second clutch control portion F includes a second proportional control solenoid valve VFS2, a first clutch side pressure control valve 22, and a second clutch side pressure switching valve 24. The first clutch side pressure control valve 22 is integrally formed with the second proportional control solenoid valve VFS2. The second clutch side pressure switching valve 24 controls the hydraulic line according to the control pressure of the second proportional control solenoid valve VFS2 and the control pressure of the first reducing valve 12.

The third clutch control portion G includes a third proportional control solenoid valve VFS3, a third clutch side pressure control valve 26, a third clutch side pressure switching valve 28, and a first switching valve 30. The third clutch side pressure control valve 26 is integrally formed with the third proportional control solenoid valve VFS3. The third clutch side pressure switching valve 28 controls the hydraulic line according to the control pressure of the third proportional control solenoid valve VFS3 and the control pressure of the first reducing valve 12. The first switching valve 30 is controlled by the second on/off solenoid valve SS-B and a reverse range pressure.

The fourth clutch and first brake control portion H includes a fourth proportional control solenoid valve VFS4, a fourth clutch side pressure control valve 32, a fourth clutch side pressure switching valve 34, a second switching valve 36, and a third switching valve 38. The fourth clutch side pressure control valve 32 is integrally formed with the fourth proportional control solenoid valve VFS4. The fourth clutch side pressure switching valve 34 controls the hydraulic line according to the control pressure of the fourth proportional control solenoid valve VFS4 and the control pressure of the first reducing valve 12. The second switching valve 36 controls the hydraulic line according to the control pressure of the first on/off solenoid valve SS-A and selectively supplies the hydraulic pressure supplied from the fourth proportional control solenoid valve VFS4 to the fourth clutch C4 and the first brake B1. The third switching valve 38 is controlled by the control pressure supplied from the first switching valve 30 and selectively supplies the hydraulic pressure supplied from the first switching valve 30 and the second switching valve 36 to the first brake B1.

The second brake control portion I includes a fifth proportional control solenoid valve VFS5, a second brake side pressure control valve 40, and a second brake side pressure switching valve 42. The second brake side pressure control valve 40 is integrally formed with the fifth proportional control solenoid valve VFS5. The second brake side pressure switching valve 42 controls the hydraulic line according to the control pressure of the fifth proportional control solenoid valve VFS5 and the control pressure of the first reducing valve 12.

In more detail, as shown in FIG. 3, the manual valve 16 supplies the hydraulic pressure, supplied from a line pressure line 44 connected to the regulator valve 4, selectively to a forward range pressure line 46 and a reverse range pressure line 48 according to a change in drive ranges.

The forward range pressure line 46 is connected to the first, second, and fourth clutch side pressure control valves 18, 22, and 32 and the third clutch side pressure switching valve 28.

The reverse range pressure line 48 is connected to the first switching valve 30.

Figure 4:
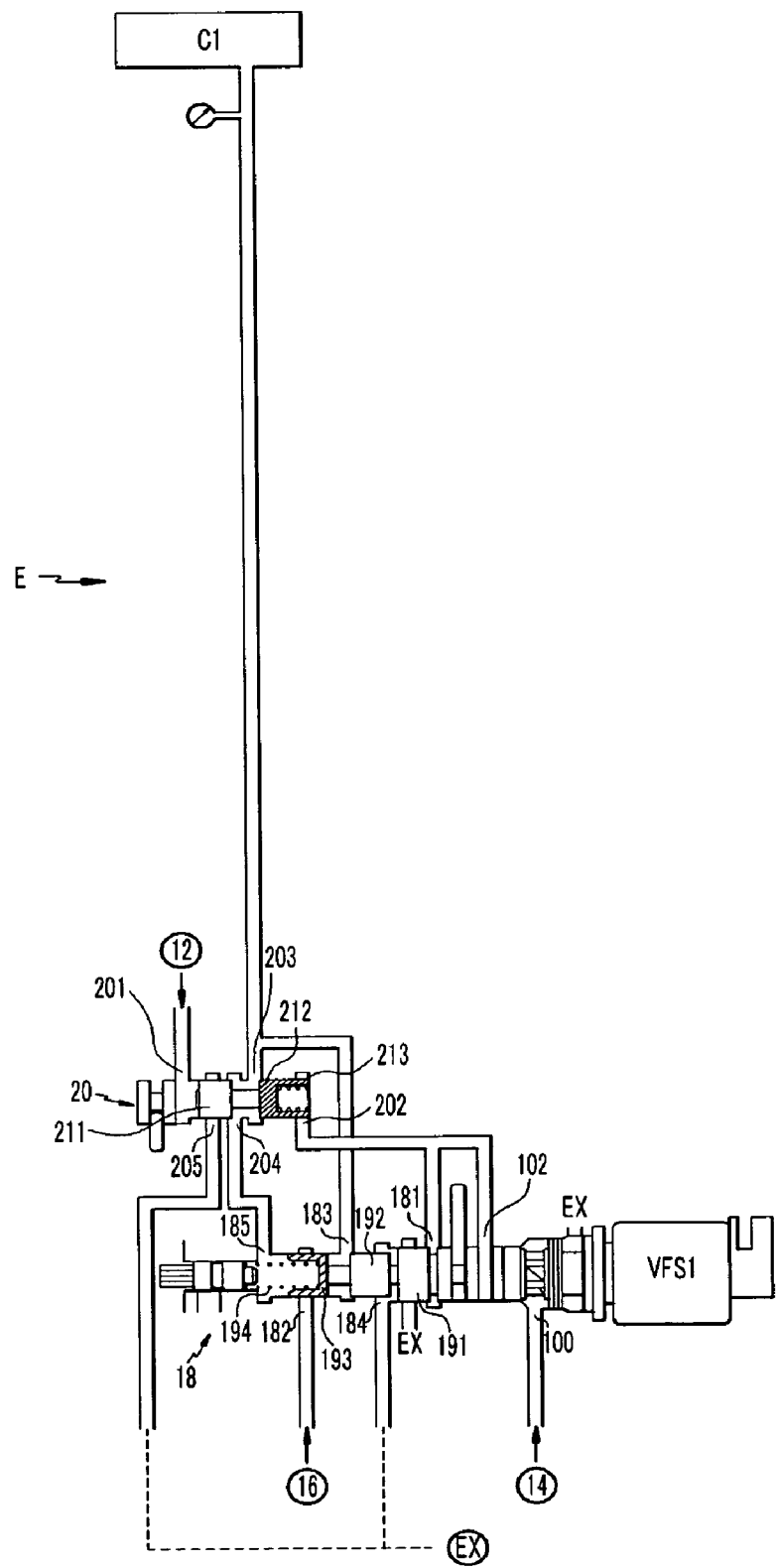
FIG. 4 is detailed diagram of a first clutch control portion according to an exemplary embodiment of the present invention.

FIG. 4 is detailed diagram of the first clutch control portion E. The first proportional control solenoid valve VFS1 includes an input port 100 receiving the control pressure of the second reducing valve 14 and an output port 102 supplying the hydraulic pressure supplied from the input port 100 to the first clutch side pressure control valve 18 and the first clutch side pressure switching valve 20.

The first proportional control solenoid valve VFS1 is a normal high type. That is, the hydraulic pressure stays at the input port 100 in a turned-on state, and the control pressure is supplied through the output port 102 in a turned-off state.

The first clutch side pressure control valve 18 integrally formed with the first proportional control solenoid valve VFS1 includes a valve body and a valve spool.

The valve body of the first clutch side pressure control valve 18 includes first to fifth ports 181, 182, 183, 184, and 185. The first port 181 receives the control pressure of the first proportional control solenoid valve VFS1. The second port 182 receives the forward range pressure of the manual valve 16. The third port 183 supplies the hydraulic pressure supplied through the second port 182 to the first clutch C1. The fourth port 184 exhausts the hydraulic pressure supplied to the first clutch C1. The fifth port 185 receives the hydraulic pressure supplied to the first clutch C1 when the first proportional control solenoid valve VFS1 is turned on.

The valve spool installed in the valve body of the first clutch side pressure control valve 18 includes a first land 191, a second land 192, and a third land 193. The first land 191 receives the control pressure supplied through the first port 181. The second land 192 selectively closes the fourth port 184. The third land 193, cooperatively with the second land 192, selectively enables communication of the second and third ports 182 and 183.

An elastic member 194, which always biases the valve spool to the right in the drawing, is disposed between the third land 193 and the valve body.

Therefore, the valve spool controls the hydraulic pressure supplied through the second port 182 so as to supply an operating pressure to the first clutch C1 through the third port 183 by the control pressure of the first proportional control solenoid valve VFS1 and an elastic force of the elastic member 194.

The first clutch side pressure switching valve 20 includes a valve body and a valve spool.

The valve body of the first clutch side pressure switching valve 20 includes first to fifth ports 201, 202, 203, 204, and 205. The first port 201 receives the control pressure of the first reducing valve 12. The second port 202 is disposed at an opposite side of the first port 201, and receives the control pressure of the first proportional control solenoid valve VFS1. The third port 203 partially receives the hydraulic pressure supplied from the first clutch side pressure control valve 18 to the first clutch C1. The fourth port 204 is connected with the fifth port 185 of the first clutch side pressure control valve 18. The fifth port 205 selectively communicates with the fourth port 204.

The valve spool installed in the valve body of the first clutch side pressure switching valve 20 includes a first land 211 and a second land 212. The first land 211 receives the control pressure supplied through the first port 201 and then closes the fifth port 205. The second land 212 selectively closes the third port 203 and, cooperatively with the first land 211, selectively enables communication of the fourth and fifth ports 204 and 205 by the control pressure supplied through the second port 202.

An elastic member 213, which always biases the valve spool to the first port 201, is disposed between the second land 212 and the valve body.

In a state that an engine is started, the valve spool is biased to the right in the drawing. When the first proportional control solenoid valve VFS1 is turned off, the valve spool moves to the left in the drawing, closes the third port 203, and enables communication of the fourth and fifth ports 204 and 205. When the first proportional control solenoid valve VFS1 is turned on, the valve spool moves to the right in the drawing by the control pressure of the first port 201 and enables communication of the third and fourth ports 203 and 204.

Figure 5:
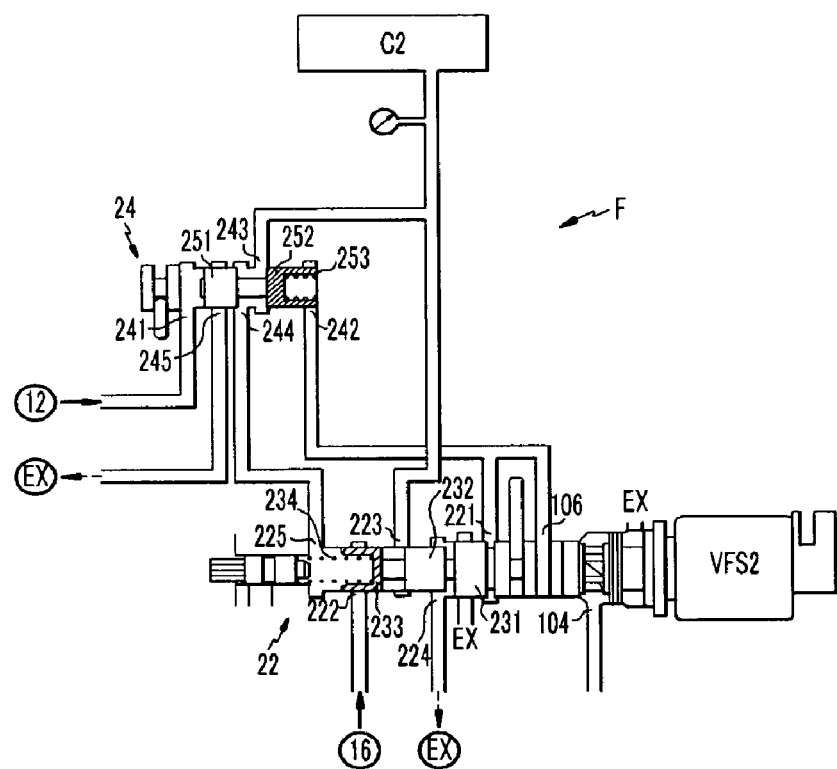
FIG. 5 is detailed diagram of a second clutch control portion according to an exemplary embodiment of the present invention.

FIG. 5 is a detailed diagram of the second clutch control portion F. The second proportional control solenoid valve VFS2 includes an input port 104 receiving the control pressure of the second reducing valve 14 and an output port 106 supplying the hydraulic pressure supplied through the input port 104 to the second clutch side hydraulic pressure control valve 22 and the second clutch side pressure switching valve 24 in a turned-on state. The second proportional control solenoid valve VFS2 is a normal low type. That is, the hydraulic pressure stays at the input port 104 in a turned-off state, and the control pressure is supplied through the output port 106 in a turned-on state.

The second clutch side pressure control valve 22 integrally formed with the second proportional control solenoid valve VFS2 includes a valve body and a valve spool.

The valve body of the second clutch side pressure control valve 22 includes first to fifth ports 221, 222, 223, 224, and 225. The first port 221 receives the control pressure of the second proportional control solenoid valve VFS2. The second port 222 receives the forward range pressure from the manual valve 16. The third port 223 supplies the hydraulic pressure supplied through the second port 222 to the second clutch C2. The fourth port 224 exhausts the hydraulic pressure supplied to the second clutch C2. The fifth port 225 receives the hydraulic pressure supplied to the second clutch C2 when the second proportional control solenoid valve VFS2 is turned off.

The valve spool installed in the valve body of the second clutch side pressure control valve 22 includes first to third lands 231, 232, and 233. The first land 231 receives the control pressure supplied through the first port 221. The second land 232 selectively closes the fourth port 224. The third land 233, cooperatively with the second land 232, selectively enables communication of the second and third ports 222 and 223.

An elastic member 234, which always biases the valve spool to the right, is disposed between the third land 233 and the valve body.

The valve spool controls the hydraulic pressure supplied through the second port 222 so as to supply an operating pressure to the second clutch C2 through the third port 223 by the control pressure of the second proportional control solenoid valve VFS2 and an elastic force of the elastic member 234.

The second clutch side pressure switching valve 24 includes a valve body and a valve spool.

The valve body of the second clutch side pressure switching valve 24 includes first to fifth ports 241, 242, 243, 244, and 245. The first port 241 receives the control pressure of the first reducing valve 12. The second port 242 is formed at an opposite side of the first port 241 and receives the control pressure of the second proportional control solenoid valve VFS2. The third port 243 partially receives the hydraulic pressure supplied from the second clutch side pressure control valve 22 to the second clutch C2. The fourth port 244 is connected with the fifth port 225 of the second clutch side pressure control valve 22. The fifth port 245 selectively communicates with the fourth port 244.

The valve spool installed in the valve body of the second clutch side pressure switching valve 24 includes a first land 251 and a second land 252. The first land 251 receives the control pressure supplied through the first port 241 and then closes the fifth port 245. The second land 252 selectively closes the third port 243 and, cooperatively with the first land 251, selectively enables communication of the fourth and fifth ports 244 and 245 by the control pressure of the second port 242.

An elastic member 253, which always biases the valve spool to the first port 241, is disposed between the second land 252 and the valve body.

In a state that an engine is started, the valve spool is biased to the right in the drawing. When the second proportional control solenoid valve VFS2 is turned on, the valve spool moves to the left in the drawing, closes the third port 243, and enables communication of the fourth and fifth ports 244 and 245. When the second proportional control solenoid valve VFS2 is turned off, the valve spool moves to the right in the drawing by the control pressure of the first port 241 and enables communication of the third and fourth ports 243 and 244.

Figure 6:
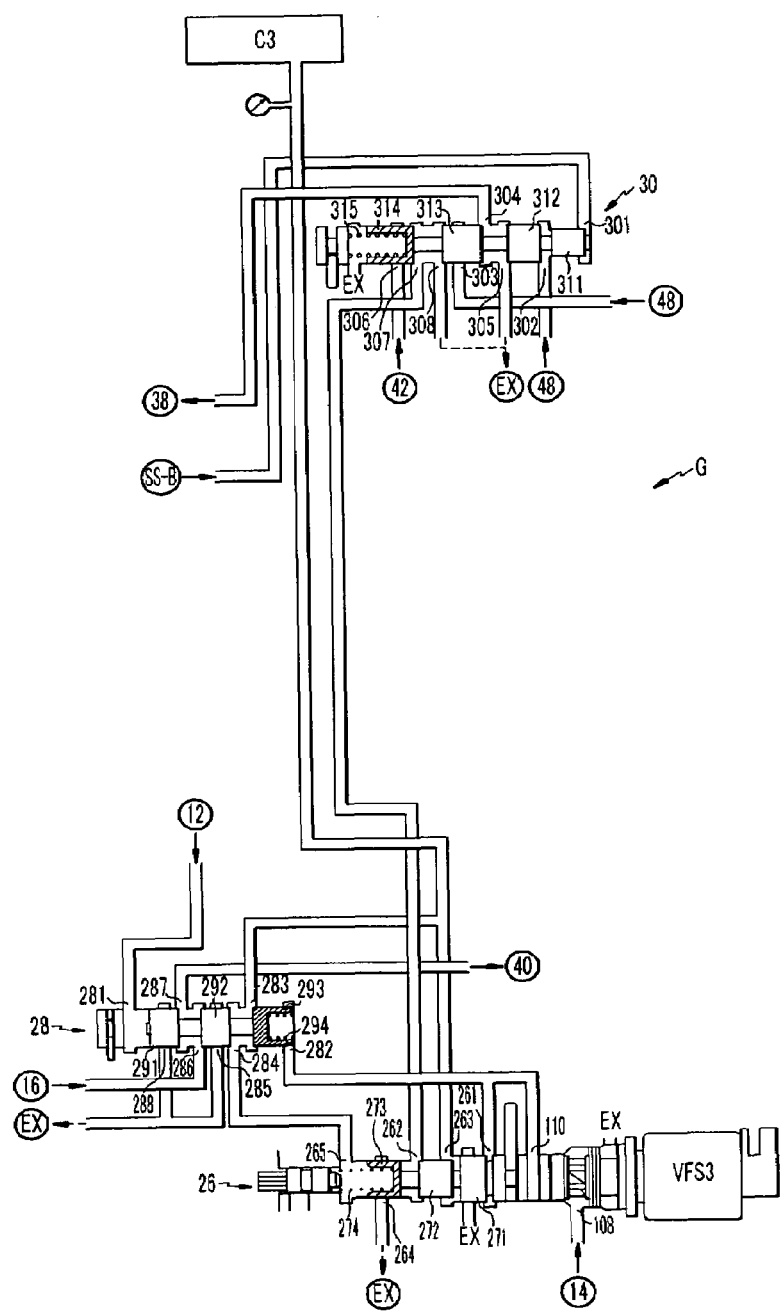
FIG. 6 is detailed diagram of a third clutch control portion according to an exemplary embodiment of the present invention.

FIG. 6 is a detailed diagram of the third clutch control portion G. The third proportional control solenoid valve VFS3 includes an input port 108 receiving the control pressure of the second reducing valve 14 and an output port 110 supplying the hydraulic pressure supplied through the input port 108 to the third clutch side pressure control valve 26 and the third clutch side pressure switching valve 28 in a turned-on state. The third proportional control solenoid valve VFS3 is a normal high type. That is, the hydraulic pressure stays at the input port 108 in a turned-on state, and the control pressure is supplied through the output port 110 in a turned-off state.

The third clutch side pressure control valve 26 integrally formed with the third proportional control solenoid valve VFS3 includes a valve body and a valve spool.

The valve body of the third clutch side pressure control valve 26 includes first to fifth ports 261, 262, 263, 264, and 265. The first port 261 receives the control pressure of the third proportional control solenoid valve VFS3. The second port 262 receives the forward range pressure from the first switching valve 30. The third port 263 supplies the hydraulic pressure supplied through the second port 262 to the third clutch C3. The fourth port 264 exhausts the hydraulic pressure supplied to the third clutch C3. The fifth port 265 partially receives the hydraulic pressure supplied to the third clutch C3 when the third proportional control solenoid valve VFS3 is turned on.

The valve spool installed in the valve body of the third clutch side pressure control valve 26 includes first to third lands 271, 272, and 273. The first land 271 receives the control pressure supplied through the first port 261. The second land 272 selectively enables communication of the second and third ports 262 and 263. The third land 273 selectively closes the fourth port 264.

An elastic member 274, which always biases the valve spool to the right in the drawing, is disposed between the third land 273 and the valve body.

The valve spool controls the hydraulic pressure supplied through the second port 262 so as to supply an operating pressure to the third clutch C3 through the third port 263 by the control pressure of the third proportional control solenoid valve VFS3 and an elastic force of the elastic member 274.

The third clutch side pressure switching valve 28 includes a valve body and a valve spool.

The valve body of the third clutch side pressure switching valve 28 includes first to eighth ports 281, 282, 283, 284, 285, 286, 287, and 288. The first port 281 receives the control pressure of the first reducing valve 12. The second port 282 is formed at an opposite side of the first port 281 and receives the control pressure of the third proportional control solenoid valve VFS3. The third port 283 partially receives the hydraulic pressure supplied from the third clutch side pressure control valve 26 to the third clutch C3. The fourth port 284 is connected with the fifth port 265 of the third clutch side pressure control valve 26. The fifth port 285 selectively communicates with the fourth port 284 and exhausts the hydraulic pressure of the fourth port 284. The sixth port 286 receives the forward range pressure from the manual valve 16. The seventh port 287 selectively supplies the forward range pressure of the sixth port 286 to the second brake side pressure control valve 40. The eighth port 288 selectively communicates with the seventh port 287 and exhausts the hydraulic pressure of the seventh port 287.

The valve spool installed in the valve body of the third clutch side pressure switching valve 28 includes first to third lands 291, 292, and 293. The first land 291 receives the control pressure supplied through the first port 281 and closes the eighth port 288. The second land 292, cooperatively with the first land 291, selectively enables communication of the seventh and sixth ports 287 and 286 or the seventh and eighth ports 287 and 288. The third land 293 selectively closes the third port 283 and, cooperatively with the second land 292, selectively enables communication of the fourth and fifth ports 284 and 285 by the control pressure of the second port 282.

An elastic member 294, which always biases the valve spool to the first port 281, is disposed between the third land 293 and the valve body.

In a state that an engine is started, the valve spool is biased to the right in the drawing. When the third proportional control solenoid valve VFS3 is turned off, the valve spool moves to the left in the drawing and closes the third port 283. In addition, the valve spool enables communication of the fourth and fifth ports 284 and 285 and simultaneously enables communication of the seventh and eighth ports 287 and 288. When the third proportional control solenoid valve VFS3 is turned on, the valve spool moves to the right in the drawing by the control pressure of the first port 281, enables communication of the third and fourth ports 283 and 284, and simultaneously enables communication of the sixth and seventh ports 286 and 287.

The first switching valve 30 is controlled by the control pressure of the second solenoid valve SS-B and the reverse range pressure. The first switching valve 30 supplies the forward range pressure to the third proportional control solenoid valve VFS3 or supplies the reverse range pressure to the third switching valve 38.

The first switching valve 30 includes a valve body and a valve spool.

The valve body of the first switching valve 30 includes first to eighth ports 301, 302, 303, 304, 305, 306, 307, and 308. The first port 301 receives the control pressure of the second on/off solenoid valve SS-B. The second port 302 receives the reverse range pressure as the control pressure thereof. The third port 303 receives the reverse range pressure. The fourth port 304 supplies the hydraulic pressure supplied through the third port 303 to the third switching valve 38. The fifth port 305 exhausts the hydraulic pressure of the fourth port 304. The sixth port 306 receives the forward range pressure. The seventh port 307 supplies the hydraulic pressure supplied through the sixth port 306 to the third clutch side pressure control valve 26. The eighth port 308 exhausts the hydraulic pressure supplied to the seventh port 307.

The valve spool installed in the valve body of the first switching valve 30 includes first to fourth lands 311, 312, 313, and 314. The first land 311 receives the control pressure supplied through the first port 301. The second land 312 receives the control pressure supplied through the second port 302. The third land 313, cooperatively with the second land 212, selectively enables communication of the fourth and third ports 304 and 303 or the fourth and fifth ports 304 and 305. The fourth land 314, cooperatively with the third land 313, selectively enables communication of the seventh and sixth ports 307 and 306 or the seventh and eighth ports 307 and 308.

An elastic member 315, which always biases the valve spool to the first port 301, is disposed between the fourth land 314 and the valve body.

When the control pressure is supplied through the first port 301, the valve spool moves to the left in the drawing and supplies the hydraulic pressure supplied through the sixth port 306 to the seventh port 307. When the control pressure is supplied through the second port 302, the valve spool supplies the hydraulic pressure supplied through the third port 303 to the fourth port 304.

Figure 7:
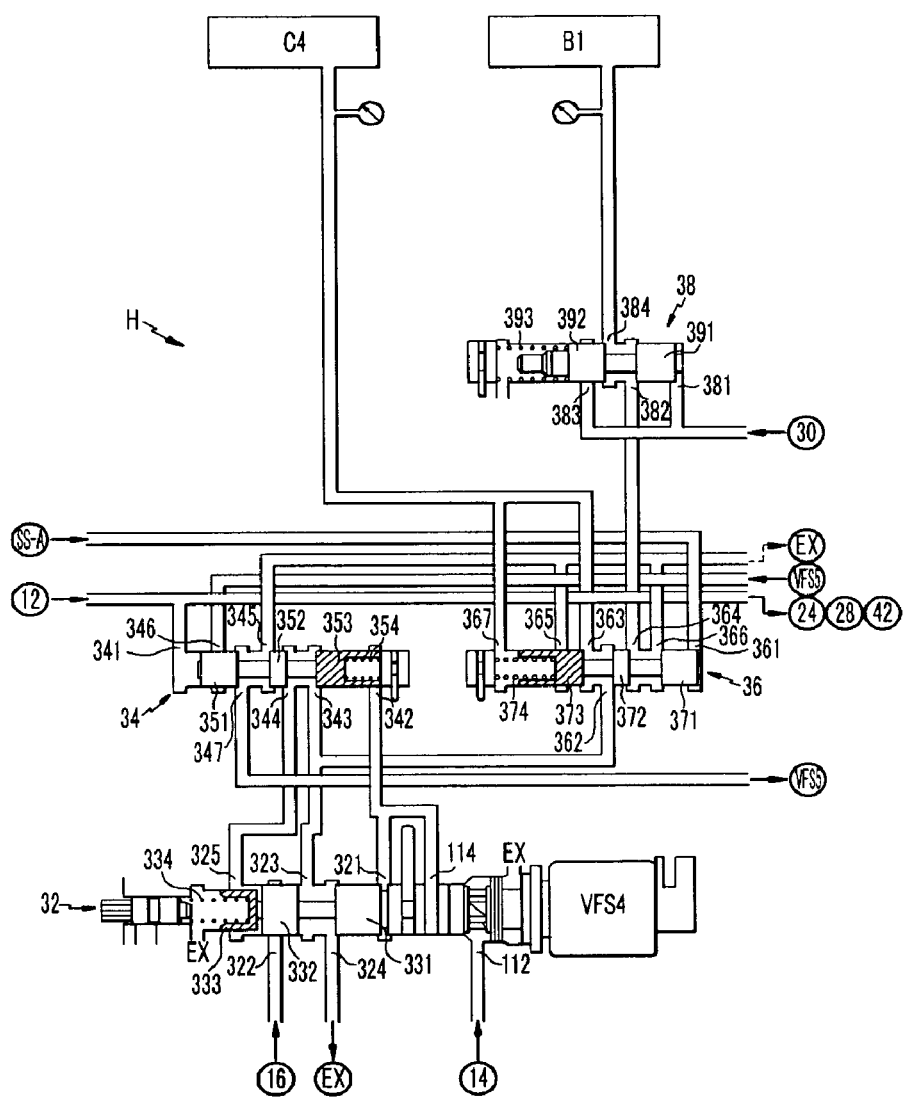
FIG. 7 is detailed diagram of a fourth clutch and a first brake control portion according to an exemplary embodiment of the present invention.

FIG. 7 is a detailed diagram of the first brake and fourth clutch control portion H. The fourth proportional control solenoid valve VFS4 includes an input port 112 receiving the control pressure of the second reducing valve 14 and an output port 114 supplying the hydraulic pressure supplied through the input port 112 to the fourth clutch side pressure control valve 32 and the fourth clutch side pressure switching valve 34 in a turned-on state. The fourth proportional control solenoid valve VFS4 is a normal high type. That is, the hydraulic pressure stays at the input port 112 in a turned-on state, and the control pressure is supplied through the output port 114 in a turned-off state.

The fourth clutch side pressure control valve 32 integrally formed with the fourth proportional control solenoid valve VFS4 includes a valve body and a valve spool.

The valve body of the fourth clutch side pressure control valve 32 includes first to fifth ports 321, 322, 323, 324, and 325. The first port 321 receives the control pressure of the fourth proportional control solenoid valve VFS4. The second port 322 receives the forward range pressure from the manual valve 16. The third port 323 supplies the hydraulic pressure supplied through the second port 322 to the fourth clutch side pressure switching valve 34 and the second switching valve

36. The fourth port 324 exhausts the hydraulic pressure supplied to the third port 323. The fifth port 325 partially receives the hydraulic pressure supplied to the fourth clutch side pressure switching valve 34 when the fourth proportional control solenoid valve VFS4 is turned on.

The valve spool installed in the valve body of the fourth clutch side pressure control valve 32 includes first to third lands 331, 332, and 333. The first land 331 receives the control pressure supplied through the first port 321. The second land 332 selectively closes the second port 322. The third land 333, cooperatively with the second land 332, selectively enables communication of the second and third ports 322 and 323.

An elastic member 334, which always biases the valve spool to the right in the drawing, is disposed between the third land 333 and the valve body.

The valve spool controls the hydraulic pressure supplied through the second port 322 by the control pressure of the fourth proportional control solenoid valve VFS4 and an elastic force of the elastic member 334 so as to supply an operating pressure to the fourth clutch side pressure switching valve 34 and the second switching valve 36 through the third port 323.

The fourth clutch side pressure switching valve 34 includes a valve body and a valve spool.

The valve body of the fourth clutch side pressure switching valve 34 includes first to seventh ports 341, 342, 343, 344, 345, 346, and 347. The first port 341 receives the control pressure of the first reducing valve 12. The second port 342 is formed at an opposite side of the first port 341 and receives the control pressure of the fourth proportional control solenoid valve VFS4. The third port 343 partially receives the hydraulic pressure supplied from the fourth clutch side pressure control valve 32 to the second switching valve 36. The fourth port 344 is connected with the fifth port 325 of the fourth clutch side pressure control valve 32. The fifth port 345 selectively communicates with the fourth port 344 and exhausts the hydraulic pressure of the fourth port 344. The sixth port 346 receives the control pressure from the fifth proportional control solenoid valve VFS5. The seventh port 347 selectively supplies the hydraulic pressure supplied through the sixth port 346 to the fifth proportional control solenoid valve VFS5.

The valve spool installed in the valve body of the fourth clutch side pressure switching valve 34 includes first to third lands 351, 352, and 353. The first land 351 receives the control pressure supplied through the first port 341 and closes the sixth port 346. The second land 352, cooperatively with the first land 351, selectively enables communication of the seventh and fifth ports 347 and 345 or the seventh and sixth ports 347 and 346. The third land selectively closes the third port 343 and, cooperatively with the second land 352, selectively enables communication of the fourth and fifth ports 344 and 345 by the control pressure supplied through the second port 342.

An elastic member 354, which always biases the valve spool to the first port 341, is disposed between the third land 353 and the valve body.

In a state that an engine is started, the valve spool is biased to the right in the drawing. When the fourth proportional control solenoid valve VFS4 is turned off, the valve spool moves to the left in the drawing and closes the third port 343. In addition, the valve spool enables communication of the fourth and fifth ports 344 and 345 and simultaneously enables communication of the sixth and seventh ports 346 and 347. When the fourth proportional control solenoid valve VFS4 is turned on, the valve spool moves to the right in the drawing by the control pressure of the first port 341. In addition, the valve spool enables communication of the third and fourth ports 343 and 344 and simultaneously enables communication of the fifth and seventh ports 345 and 347.

The second switching valve 36 is controlled by the control pressure of the first on/off solenoid valve SS-A. The second switching valve 36 supplies the forward range pressure to the fourth clutch C4 or supplies the forward range pressure to the first brake B1 through the third switching valve 38.

The second switching valve 36 includes a valve body and a valve spool.

The valve body of the second switching valve 36 includes first to seventh ports 361, 362, 363, 364, 365, 366, and 367. The first port 361 receives the control pressure of the first on/off solenoid valve SS-A. The second port 362 receives the forward range pressure from the fourth clutch side pressure control valve 32. The third port 363 supplies the hydraulic pressure supplied through the second port 362 to the fourth clutch C4. The fourth port 364 supplies the hydraulic pressure supplied through the second port 362 to the third switching valve 38. The fifth port 365 exhausts the hydraulic pressure supplied to the third port 363. The sixth port 366 exhausts the hydraulic pressure supplied to the fourth port 364. The seventh port 367 partially receives the hydraulic pressure of the third port 363.

The valve spool installed in the valve body of the second switching valve 36 includes first to third lands 371, 372, and 373. The first land 371 receives the control pressure supplied through the first port 361. The second land 372, cooperatively with the first land 371, selectively enables communication of the fourth and second ports 364 and 362 or the fourth and sixth ports 364 and 366. The third land 373, cooperatively with the second land 372, selectively enables communication of the third and second ports 363 and 362 or the third and fifth ports 363 and 365.

An elastic member 374, which always biases the valve spool to the first port 361, is disposed between the third land 373 and the valve body.

When the control pressure is supplied through the first port 361, the valve spool moves to the left in the drawing and supplies the hydraulic pressure supplied through the second port 362 to the fourth port 364. When the control pressure is released, the valve spool moves to the right in the drawing by an elastic force of the elastic member 374 and supplies the hydraulic pressure supplied through the second port 362 to the third port 363.

The third switching valve 38 includes a valve body and a valve spool.

The valve body of the third switching valve 38 includes first to fourth ports 381, 382, 383, and 384. The first port 381 receives the reverse range pressure from the first switching valve 30 as its control pressure. The second port 382 receives the forward range pressure from the second switching valve 36. The third port 383 receives the reverse range pressure from the first switching valve 30. The fourth port 384 supplies the hydraulic pressure supplied from the second port 382 and the third port 383 to the first brake B1.

In addition, the valve spool installed in the valve body includes a first land 391 and a second land 392. The first land 391 receives the control pressure supplied through the first port 381. The second land 392, cooperatively with the first land 391, selectively enables communication of the fourth and second ports 384 and 382 or the fourth and third ports 384 and 383.

An elastic member 394 is disposed between the second land 392 and the valve body.

In a normal state, the valve spool moves to the right in the drawing by the elastic member 394 and enables communication of the second and fourth ports 382 and 384. When the control pressure is supplied through the first port 381, the valve spool moves to the left in the drawing and enables communication of the third and fourth ports 383 and 384 so as to supply the reverse range pressure to the first brake B1.

Figure 8:
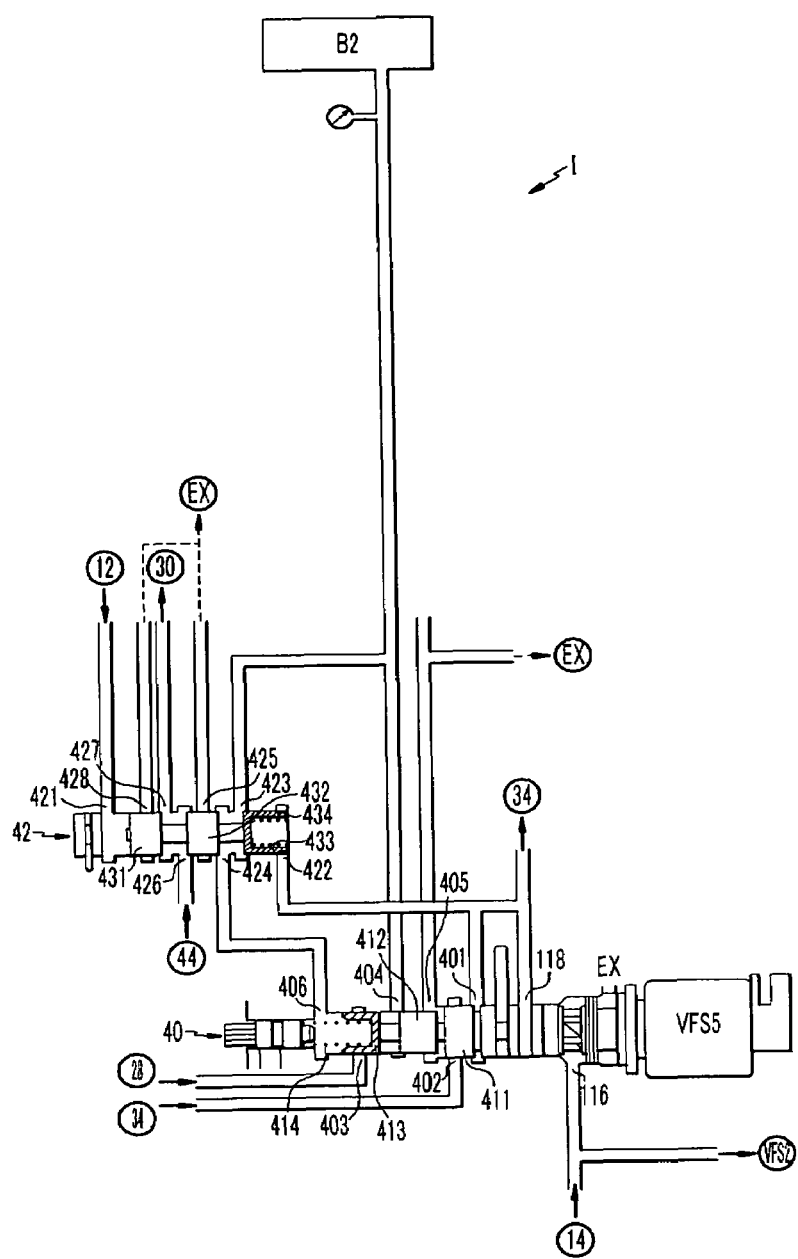
FIG. 8 is detailed diagram of a second brake control portion according to an exemplary embodiment of the present invention.

FIG. 8 is a detailed diagram of the second brake control portion I. The fifth proportional control solenoid valve VFS5 includes an input port 116 receiving the control pressure of the second reducing valve 14 and an output port 118 supplying the hydraulic pressure supplied through the input port 116 to the second brake side pressure control valve 40 and the second brake side pressure switching valve 42 in a turned-off state. The fifth proportional control solenoid valve VFS5 is a normal low type. That is, the hydraulic pressure stays at the input port 116 in a turned-off state, and the control pressure is supplied through the output port 118 in a turned-on state.

The second brake side pressure control valve 40 integrally formed with the fifth proportional control solenoid valve VFS5 includes a valve body and a valve spool.

The valve body of second brake side pressure control valve 40 includes first to sixth ports 401, 402, 403, 404, 405, and 406. The first port 401 receives the control pressure of the fifth proportional control solenoid valve VFS5. The second port 402 receives the hydraulic pressure from the third clutch side pressure switching valve 34. The third port 403 receives the forward range pressure from the third clutch side pressure switching valve 28. The fourth port 404 supplies the hydraulic pressure supplied through the third port 403 to the second brake B2. The fifth port 405 exhausts the hydraulic pressure supplied to the fourth port 404. The sixth port 406 partially receives the hydraulic pressure supplied to the second brake B2 when the fifth proportional control solenoid valve VFS5 is turned off.

The valve spool installed in the valve body of second brake side pressure control valve 40 includes first to third lands 411, 412, and 413. The first land 411 receives the control pressure supplied through the first port 401. The second land 412 receives the control pressure supplied through the second port 402. The third land 413, cooperatively with the second land 412, selectively enables communication of the fourth and third ports 404 and 403 or the fourth and fifth ports 404 and 405.

An elastic member 414, which always biases the valve spool to the right in the drawing, is disposed between the third land 413 and the valve body.

The valve spool controls the hydraulic pressure supplied through the third port 403 and supplies an operating pressure to the second brake B2 through the fourth port 404 by the control pressure of the fifth proportional control solenoid valve VFS5 and an elastic force of the elastic member 414.

The second brake side pressure switching valve 42 includes a valve body and a valve spool.

The valve body of the second brake side pressure switching valve 42 includes first to eighth ports 421, 422, 423, 424, 425, 426, 427, and 428. The first port 421 receives the control pressure of the first reducing valve 12. The second port 422 is formed at an opposite side to the first port 421 and receives the control pressure of the fifth proportional control solenoid valve VFS5. The third port 423 partially receives the hydraulic pressure supplied from the second brake side pressure control valve 40 to the second brake B2. The fourth port 424 is connected with the sixth port 406 of the second brake side pressure control valve 40. The fifth port 425 selectively communicates with the fourth port 424 and exhausts the hydraulic pressure of the fourth port 424. The sixth port 426 receives the line pressure from the line pressure line 44. The seventh port 427 selectively supplies the line pressure of the sixth port 426 to the first switching valve 30. The eighth port 428 selectively communicates with the seventh port 427 and exhausts the hydraulic pressure of the seventh port 427.

The valve spool installed in the valve body of the second brake side pressure switching valve 42 includes first to third lands 431, 432, and 433. The first land 431 receives the control pressure supplied through the first port 421 and closes the eighth port 428. The second land 432, cooperatively with the first land 431, enables communication of the seventh and sixth ports 427 and 426 or the seventh and eighth ports 427 and 428. The third land 433 selectively closes the third port 423 and, cooperatively with the second land 432, selectively enables communication of the fourth and third ports 424 and 423 or the fourth and fifth ports 424 and 425 by the control pressure supplied through the second port 422.

An elastic member 434, which always biases the valve spool to the first port 421, is disposed between the third land 433 and the valve body.

In a state that the engine is started, the valve spool is biased to the right in the drawing. When the fifth proportional control solenoid valve VFS5 is turned on, the valve spool moves to the left in the drawing and closes the third port 423. In addition, the valve spool enables communication of the fourth and fifth ports 424 and 425 and simultaneously enables communication of the seventh and eighth ports 427 and 428. When the fifth proportional control solenoid valve VFS5 is turned off, the valve spool moves to the right in the drawing, enables communication of the third and fourth ports 423 and 424, and simultaneously enables communication of the sixth and seventh ports 426 and 427.

In the hydraulic control system according to an exemplary embodiment of the present invention, the first and second solenoid valves and the proportional control solenoid valves are operated according to the following Table 1 for respective speeds.

TABLE 1

| | | DeletedTexts | | | | |
|---|---|---|---|---|---|---|
| SS-A | SS-B | VFS1 | FS2 | VFS3 | VFS4 | VFS5 |
| N. P | | • | | • | • | |
| 1ST | | | | • | • | |
| 2ND | | | | • | • | • |
| 3RD | | | • | • | • | |
| 4TH | • | | | | • | |
| 5TH | | | | • | | |
| 6TH | | • | • | | | |
| 7TH | | • | | • | | • |
| L | • | | | • | • | |
| REV | | • | • | | • | |

Hereinafter, an operation of the hydraulic control system according to an exemplary embodiment of the present invention will be described in detail.

That is, when the hydraulic pressure is generated by the hydraulic pump in a state of N or P ranges, the line pressure is supplied to the first and second reducing valves 12 and 14, the manual valve 16, and the second brake side pressure switching valve 42. In this case, the control pressure of the first reducing valve 12 is supplied to the clutch and brake side pressure switching valves 20, 24, 28, 34, and 42, and the control pressure of the second reducing valve 14 is supplied to the proportional control solenoid valves VFS1, VFS2, VFS3, VFS4, and VFS5 as their control pressure.

In this state, the normal high type valves of the first, third, and fourth proportional control solenoid valves VFS1, VFS3, and VFS4 are turned on, and the normal low type valves of the second and fifth proportional control solenoid valves VFS2 and VFS5 are turned off. Therefore, the hydraulic pressure is not supplied to every frictional element.

[The First Forward Speed]

When the manual valve 16 is changed to the D range for starting the vehicle, the first proportional control solenoid valve VFS1 is changed from the turned-on state to the turned-off state. Accordingly, an operating pressure is supplied to the first clutch C1 and automatically the one-way clutch F1 is operated.

When the first proportional control solenoid valve VFS1 is turned off, the control pressure is supplied to the first port 181 of the first clutch side pressure control valve 18 and the second port 122 of the pressure switching valve 20. Therefore, the valve spool moves to the left in the drawing.

In this case, the forward range pressure supplied to the second port 182 of the first clutch side pressure control valve 18 is supplied to the first clutch C1 through the third port 183 and shifting to the first forward speed is realized.

[The Second Forward Speed]

When the vehicle speed increases in such a state of the first forward speed, a transmission control unit (not shown) controls the fifth proportional control solenoid valve VFS5 to be turned on.

Therefore, the control pressure of the fifth proportional control solenoid valve VFS5 is supplied to the first port 401 of the second brake side pressure control valve 40 and the second port 422 of the second brake side pressure switching valve 42, and accordingly, the valve spool moves to the left in the drawing.

Then, the forward range pressure supplied to the third port 403 of the second brake side pressure control valve 40 through the second clutch side pressure switching valve 28 is supplied to the second brake B2 through the fourth port 404.

Therefore, the first clutch C1 and the second brake B2 are simultaneously operated and shifting to the second forward speed is realized.

[The Third Forward Speed]

When the vehicle speed increases in such a state of the second forward speed, the transmission control unit (not shown) controls the fifth proportional control solenoid valve VFS5 to be turned off and the second proportional control solenoid valve VFS2 to be turned on.

Therefore, the pressure supply of the fifth proportional control solenoid valve VFS5 is cut off, and accordingly, the valve spools of the second brake side pressure control valve 40 and the second brake side pressure switching valve 42 move to the right in the drawing. Consequently, the hydraulic pressure supplied to the second brake B2 is exhausted through the second brake side pressure control valve 40 and thus the second brake B2 is released.

In addition, the hydraulic pressure supplied through the third port 423 of the second brake side pressure switching valve 42 is supplied to the sixth port 406 of the second brake side pressure control valve 40 through the fourth port 424 according to a movement of the valve spool and is exhausted.

In addition, as the second proportional control solenoid valve VFS2 is turned on, the control pressure is supplied to the first port 221 of the second clutch side pressure control valve 22 and the second port 242 of the second clutch side pressure switching valve 24. Therefore, the valve spools move to the left in the drawing.

Then, the forward range pressure supplied to the second port 222 of the second clutch side brake side pressure control valve 22 is supplied to the second clutch C2 through the third port 223 and thus the second clutch C2 is operated.

Therefore, the first and second clutches C1 and C2 are simultaneously operated and shifting to the third forward speed is realized.

[The Fourth Forward Speed]

When the vehicle speed increases in such a state of the third forward speed, the transmission control unit (not shown) controls the second and third proportional control solenoid valves VFS2 and VFS3 to be turned off, and controls the second on/off solenoid valve SS-B to be turned on.

Therefore, the pressure supply of the second proportional control solenoid valve VFS2 is cut off, and accordingly, the valve spools of the second clutch side pressure control valve 22 and the second clutch side pressure switching valve 24 move to the right in the drawing. Consequently, the hydraulic pressure supplied to the second clutch C2 is exhausted through the fourth port 224 of the second clutch side pressure control valve 22 and thus the second clutch C2 is released.

In addition, the hydraulic pressure supplied to the third port 243 of the second clutch side pressure switching valve 24 is supplied to the fifth port 225 of the second clutch side pressure control valve 22 through the fourth port 244 according to a movement of the valve spool and is exhausted.

In addition, as the third proportional control solenoid valve VFS3 is turned off, the control pressure is supplied to the first port 261 of the third clutch side pressure control valve 26 and the second port 282 of the pressure switching valve 28. Therefore, the valve spools move to the left in the drawing. Therefore, the second port 262 and the third port 263 of the third clutch side pressure control valve 26 communicate with each other.

In addition, when the second on/off solenoid valve SS-B is turned on, the valve spool of the first switching valve 30 moves to the left in the drawing. Then, the sixth port 306 and the seventh port 307 are opened. Therefore, the line pressure supplied through the second brake side pressure switching valve 42 is supplied to the third clutch C3 through the first switching valve 30 and the third clutch side pressure control valve 26. Therefore, the third clutch C3 is operated.

Consequently, the first and third clutches C1 and C3 are simultaneously operated and shifting to the fourth forward speed is realized.

[The Fifth Forward Speed]

When the vehicle speed increases in such a state of the fourth forward speed, the transmission control unit (not shown) controls the fourth proportional control solenoid valve VFS4 and the second on/off solenoid valve SS-B to be turned off, and controls the third proportional control solenoid valve VFS3 to be turned on.

Therefore, the hydraulic pressure supplied to the third clutch C3 is cut off, and the pressure supply of the third proportional control solenoid valve VFS3 is cut off. Therefore, the valve spools of the third clutch side pressure control valve 26 and the third clutch side pressure switching valve 28 move to the right in the drawing and the hydraulic pressure supplied to the third clutch C3 is exhausted through the fourth port 264 of the third clutch side pressure control valve 26. Therefore, the third clutch C3 is released.

In addition, the hydraulic pressure supplied to the third port 283 of the third clutch side pressure switching valve 28 is supplied to the fifth port 265 of the third clutch side pressure control valve 26 through the fourth port 284 according to a movement of the valve spool and is exhausted.

In addition, as the fourth proportional control solenoid valve VFS4 is turned off, the control pressure is supplied to the first port 321 of the fourth clutch side pressure control valve 32 and the second port 342 of the pressure switching valve 34. Therefore, the valve spools move to the left in the drawing, and the second port 322 and the third port 323 of the fourth clutch side pressure control valve 32 communicate with each other.

Then, the forward range pressure supplied to the second port 322 of the fourth clutch side pressure control valve 32 is supplied to the fourth clutch C4 through the third port 323 and the second and third ports 362 and 363 of the second switching valve 36. Therefore, the fourth clutch C4 is operated.

Consequently, the first and fourth clutches C1 and C4 are simultaneously operated and shifting to the fifth forward speed is realized.

[The Sixth Forward Speed]

When the vehicle speed increases in such a state of the fifth forward speed, the transmission control unit (not shown) controls the third proportional control solenoid valve VFS3 to be turned off, and controls the first proportional control solenoid valve VFS1 and the second solenoid valve SS-B to be turned on.

Therefore, the pressure supply of the first proportional control solenoid valve VFS1 is cut off, and accordingly, the valve spools of the first clutch side pressure control valve 18 and the first clutch side pressure switching valve 20 move to the right in the drawing. Therefore, the hydraulic pressure supplied to the first clutch C1 is exhausted through the fourth port 184 of the first clutch side pressure control valve 18, and accordingly, the first clutch C1 is released.

In addition, the hydraulic pressure supplied to the third port 203 of the first clutch side pressure switching valve 20 is supplied to the fifth port 185 of the third clutch side pressure control valve 18 through the fourth port 204 according to a movement of the valve spool and is exhausted.

In addition, as the third proportional control solenoid valve VFS3 is turned off, the control pressure is supplied to the first port 261 of the third clutch side pressure control valve 26 and the second port 282 of the third clutch side pressure switching valve 28 and the valve spools move to the left in the drawing. Therefore, the second and third ports 262 and 263 of the third clutch side pressure control valve 26 communicate with each other, the same as at the fourth forward speed.

In addition, as the second on/off solenoid valve SS-B is turned on, the valve spool of the first switching valve 30 moves to the left in the drawing and the sixth port 306 and the seventh port 307 are opened. Therefore, the line pressure supplied through the second brake side pressure switching valve 42 is supplied to the third clutch C3 through the first switching valve 30 and the third clutch side pressure control valve 26. Therefore, the third clutch C3 is operated.

Consequently, the third and fourth clutches C3 and C4 are simultaneously operated and shifting to the sixth forward speed is realized.

[The Seventh Forward Speed]

When the vehicle speed increases in such a state of the sixth forward speed, the transmission control unit (not shown) controls the second on/off solenoid valve SS-B to be turned off, and controls the third and fifth proportional control solenoid valves VFS3 and VFS5 to be turned on.

Therefore, the pressure supply of the third proportional control solenoid valve VFS3 is cut off, and accordingly, the valve spools of the third clutch side pressure control valve 26 and the third clutch side pressure switching valve 28 move to the right in the drawing. Consequently, the hydraulic pressure supplied to the third clutch C3 is exhausted through the fourth port 264 of the third clutch side pressure control valve 26 and thus the third clutch C3 is released.

In addition, the hydraulic pressure supplied to the third port 283 of the third clutch side pressure switching valve 28 is supplied to the fifth port 265 of the third clutch side pressure control valve 26 through the fourth port 284 according to a movement of the valve spool and is exhausted.

In addition, as the fifth proportional control solenoid valve VFS5 is turned on, the control pressure is supplied to the first port 401 of the second brake side pressure control valve 40 and the second port 422 of the pressure switching valve 42 and thus the valve spools move to the left in the drawing.

Then, the forward range pressure supplied to the third port 403 of the second brake side pressure control valve 40 through the second clutch side pressure switching valve 28 is supplied to the second brake B2 through the fourth port 404 and thus the second brake B2 is operated.

Consequently, the fourth clutch C4 and the second brake B2 are simultaneously operated and shifting to the seventh forward speed is realized.

[The Reverse Speed]

At the reverse speed, in a state of the N or P ranges where the first, third, and fourth proportional control solenoid valves VFS1, VFS3, and VFS4 are turned on and the second and fifth proportional control solenoid valves VFS2 and VFS5 are turned off, the second on/off solenoid valve SS-B is turned on and the third proportional control solenoid valve VFS3 is turned off.

Then, as the third proportional control solenoid valve VFS3 is turned off, the control pressure is supplied to the first port 261 of the third clutch side pressure control valve 26 and the second port 282 of the third clutch side pressure switching valve 28. Therefore, the valve spools move to the left in the drawing, and accordingly, the second port 262 and the third port 263 of the third clutch side pressure control valve 26 communicate with each other.

In addition, as the second on/off solenoid valve SS-B is turned on, the valve spool of the first switching valve 30 moves to the left in the drawing and the sixth and seventh ports 306 and 307 are opened. Therefore, the line pressure supplied through the second brake side pressure switching valve 42 is supplied to the third clutch C3 through the first switching valve 30 and the third clutch side pressure control valve 26 and thus the third clutch C3 is operated.

In addition, the hydraulic pressure of the reverse range pressure line 48 is supplied to the third switching valve 38 through the third and fourth ports 303 and 304 of the first switching valve 30 which communicate with each other.

Then, since the control pressure is supplied to the first port 381 and the valve spool of the third switching valve 38 moves to the left in the drawing, the third and fourth ports 383 and 384 communicate with each other. Therefore, the hydraulic pressure is supplied to the first brake B1 through the third port 383.

Consequently, the third clutch C3 and the first brake B1 are simultaneously operated and shifting to the reverse speed is realized.

Hereinafter, skip shifting processes of the hydraulic control system according to an exemplary embodiment of the present invention will be described in detail. In a 4→2 skip shifting process, the third proportional control solenoid valve VFS3 is changed from the turned-off state to the turned-on state, the fifth proportional control solenoid valve VFS5 is changed from the turned-off state to the turned-on state, and the second on/off solenoid valve SS-B is changed from the turned-on state to the turned-off state such that the third clutch C3 is released and the second brake B2 is operated. Consequently, the 4→2 skip shifting is realized.

In a 4→1 skip shifting process, the third proportional control solenoid valve VFS3 is changed from the turned-off state to the turned-on state, the second on/off solenoid valve SS-B is changed from the turned-on state to the turned-off state, and the one-way clutch F1 or the first brake B1 is operated. Consequently, the 4→1 skip shifting is realized.

That is, the 4→1 skip shifting is realized by releasing the third clutch C3 and engaging the first brake B1.

In addition, at the L range, the first on/off solenoid valve SS-A is changed from the turned-off state to the turned-on state and the second switching valve 36 is operated such that when the fourth proportional control solenoid valve VFS4 is operated, the control pressure is supplied to the first brake B1.

In a 5→3 skip shifting process, the fourth proportional control solenoid valve VFS4 is changed from the turned-off state to the turned-on state and the second proportional control solenoid valve VFS2 is changed from the turned-off state to the turned-on state such that the fourth clutch C4 is released, and the second clutch C2 is operated. Consequently, the 5→3 skip shifting is realized.

In a 5→2 skip shifting process, the fourth proportional control solenoid valve VFS4 is changed from the turned-off state to the turned-on state and the fifth proportional control solenoid valve VFS5 is changed from the turned-off state to the turned-on state such that the fourth clutch C4 is released and the second brake B2 is operated. Consequently, the 5→2 skip shifting is realized.

In a 6→4 skip shifting process, the fourth proportional control solenoid valve VFS4 is changed from the turned-off state to the turned-on state and the first proportional control solenoid valve VFS1 is changed from the turned-on state to the turned-off state such that the fourth clutch C4 is released, and the first clutch C1 is operated. Consequently, the 6→4 skip shifting is realized.

In a 7→5 skip shifting process, the fifth proportional control solenoid valve VFS5 is changed from the turned-on state to the turned-off state and the first proportional control solenoid valve VFS1 is changed from the turned-on state to the turned-off state such that the second brake B2 is released, and the first clutch C1 is operated. Consequently, the 7→5 skip shifting is realized.

In a 6→3 skip shifting process, the proportional control solenoid valves are controlled such that a 6→5→3 skip shifting or a 6→4→3 skip shifting is performed. In a 7→4 skip shifting process, the proportional control solenoid valves are controlled such that a 7→6→4 skip shifting or a 7→5→4 skip shifting is performed.

As described above, a hydraulic control system of an exemplary embodiment of the present invention realizes seven speeds by using about twenty valves such that an arrangement of valves is compact and two or three speed skip shifting is possible.

Furthermore, since a precise and effective control is achieved, shift shock is minimized and drivability and fuel consumption are improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hydraulic control system of a seven-speed automatic transmission for a vehicle, comprising:
 a line pressure control portion for controlling hydraulic pressure supplied from a hydraulic pump;
 a launch control portion for multiplying torque of a torque converter and controlling engagement and release of a damper clutch;
 a pressure reduction control portion for reducing a line pressure supplied from the line pressure control portion by a first reducing valve so as to supply a control pressure to pressure switches and first and second on/off solenoid valves used for each frictional element, and supplying a control pressure of a second reducing valve to proportional control solenoid valves as their control pressure;
 a manual shift control portion for controlling a hydraulic line in accordance with a manual shifting;
 a first clutch control portion for controlling a forward range pressure according to a control of a first proportional control solenoid valve so as to supply the forward range pressure to a first clutch at first, second, third, fourth, and fifth speeds and a low L range;
 a second clutch control portion for supplying the forward range pressure to a second clutch according to a control of a second proportional control solenoid valve at the third speed;
 a third clutch control portion for controlling the line pressure according to a control of a third proportional control solenoid valve so as to supply the line pressure to a third clutch at the fourth speed and a sixth speed;
 a fourth clutch and first brake control portion for controlling the forward range pressure according to a control of a fourth proportional control solenoid valve so as to supply the forward range pressure to a fourth clutch at the fifth speed, the sixth speed, and a seventh speed, and for supplying a control pressure of the fourth proportional control solenoid valve to a first brake at the low L range; and
 a second brake control portion for supplying the forward range pressure to a second brake according to a fifth proportional control solenoid valve at the second and seventh speeds.

2. The hydraulic control system of claim 1, wherein the first, third, and fourth proportional control solenoid valves are duty control valves outputting a minimum hydraulic pressure in a turned-on state, and the second and fifth proportional control solenoid valves are duty control valves outputting a minimum hydraulic pressure in a turned-off state.

3. The hydraulic control system of claim 1, wherein the first clutch control portion comprises:
 a first clutch side pressure control valve integrally formed with the first proportional control solenoid valve; and
 a first clutch side pressure switching valve controlling the hydraulic line according to a control pressure of the first proportional control solenoid valve and a control pressure of the first reducing valve.

4. The hydraulic control system of claim 3, wherein the first clutch side pressure control valve integrally formed with the first proportional control solenoid valve comprises:
 a valve body comprising a first port receiving a control pressure of the first proportional control solenoid valve, a second port receiving the forward range pressure from a manual valve, a third port supplying the hydraulic pressure received through the second port to the first clutch, a fourth port exhausting the hydraulic pressure supplied to the first clutch, and a fifth port receiving, when the first proportional control solenoid valve is turned on, the hydraulic pressure supplied to the first clutch; and
 a valve spool comprising a first land receiving the control pressure supplied through the first port, a second land selectively closing the fourth port, and a third land, cooperatively with the second land, selectively enabling communication of the second and third ports, wherein an elastic member is disposed between the third land and the valve body.

5. The hydraulic control system of claim 3, wherein the first clutch side pressure switching valve comprises:
   a valve body comprising a first port receiving the control pressure of the first reducing valve, a second port formed at an opposite side of the first port and receiving the control pressure of the first proportional control solenoid valve, a third port partially receiving the hydraulic pressure supplied from the first clutch side pressure control valve to the first clutch, a fourth port connected to the fifth port of the first clutch side pressure control valve, and a fifth port selectively communicating with the fourth port; and
   a valve spool comprising a first land receiving the control pressure from the first port and closing the fifth port, and a second land receiving the control pressure supplied through the second port, selectively closing the third port, and selectively enabling communication of the fourth and fifth ports, cooperatively with the first land,
   wherein an elastic member is disposed between the second land and the valve body.

6. The hydraulic control system of claim 1, wherein the second clutch control portion comprises:
   a first clutch side pressure control valve integrally formed with the second proportional control solenoid valve; and
   a second clutch side pressure switching valve controlling the hydraulic line according to the control pressure of the second proportional control solenoid valve and the control pressure of the first reducing valve.

7. The hydraulic control system of claim 6, wherein the second clutch side pressure control valve integrally formed with the second proportional control solenoid valve comprises:
   a valve body comprising a first port receiving the control pressure of the second proportional control solenoid valve, a second port receiving the forward range pressure from the manual valve, a third port supplying the hydraulic pressure received through the second port to the second clutch, a fourth port exhausting the hydraulic pressure supplied to the second clutch, and a fifth port receiving, when the second proportional control solenoid valve is turned off, the hydraulic pressure supplied to the second clutch; and
   a valve spool comprising a first land receiving the control pressure supplied through the first port, a second land selectively closing the fourth port, and a third land, cooperatively with the second land, selectively enabling communication of the second and third ports,
   wherein an elastic member is disposed between the third land and the valve body.

8. The hydraulic control system of claim 6, wherein the second clutch side pressure switching valve comprises:
   a valve body comprising a first port receiving the control pressure of the first reducing valve, a second port formed at an opposite side of the first port and receiving the control pressure of the second proportional control solenoid valve, a third port partially receiving the hydraulic pressure supplied from the second clutch side pressure control valve to the second clutch, a fourth port connected with the fifth port of the second clutch side pressure control valve, and a fifth port selectively communicating with the fourth port; and
   a valve spool comprising a first land receiving the control pressure supplied through the first port and closing the fifth port, and a second land selectively closing the third port and, cooperatively with the first land, selectively enabling communication of the fourth and fifth ports by the control pressure supplied through the second port,
   wherein an elastic member is disposed between the second land and the valve body.

9. The hydraulic control system of claim 1, wherein the third clutch control portion comprises:
   a third clutch side pressure control valve integrally formed with the third proportional control solenoid valve;
   a third clutch side pressure switching valve controlling the hydraulic line according to the control pressure of the third proportional control solenoid valve and the control pressure of the first reducing valve; and
   a first switching valve controlled by the second on/off solenoid valve and a reverse range pressure of the manual valve.

10. The hydraulic control system of claim 9, wherein the third clutch side pressure control valve integrally formed with the third proportional control solenoid valve comprises:
    a valve body comprising a first port receiving the control pressure of the third proportional control solenoid valve, a second port receiving the forward range pressure from the first switching valve, a third port supplying the hydraulic pressure supplied through the second port to the third clutch, a fourth port exhausting the hydraulic pressure supplied to the third clutch, a fifth port partially receiving the hydraulic pressure supplied to the third clutch when the third proportional control solenoid valve is turned on; and
    a valve spool comprising a first land receiving the control pressure supplied through the first port, a second land selectively enabling communication of the second and third ports, and a third land selectively closing the fourth port,
    wherein an elastic member is disposed between the third land and the valve body.

11. The hydraulic control system of claim 9, wherein the third clutch side pressure switching valve comprises:
    a valve body comprising a first port receiving the control pressure of the first reducing valve, a second port formed at an opposite side of the first port and receiving the control pressure of the third proportional control solenoid valve, a third port partially receiving the hydraulic pressure supplied from the third clutch side pressure control valve to the third clutch, a fourth port connected with the fifth port of the third clutch side pressure control valve, a fifth port selectively communicating with the fourth port and exhausting the hydraulic pressure of the fourth port, a sixth port receiving the forward range pressure of the manual valve, a seventh port selectively supplying the forward range pressure supplied through the sixth port to the second brake side pressure control valve, and an eighth port selectively communicating with the seventh port and exhausting the hydraulic pressure of the seventh port; and
    a valve spool comprising a first land receiving the control pressure supplied through the first port and closing the eighth port, a second land, cooperatively with the first land, enabling communication of the seventh and sixth ports or the seventh and eighth ports, and a third land selectively closing the third port and, cooperatively with the second land, selectively enabling communication of the fourth and fifth ports by the control pressure supplied through the second port,
    wherein an elastic member is disposed between the third land and the valve body.

12. The hydraulic control system of claim 9, wherein the first switching valve is controlled by the control pressure of the second on/off solenoid valve and the reverse range pressure of the manual valve and supplies the forward range pressure to the third proportional control solenoid valve or supplies the reverse range pressure to the third switching valve.

13. The hydraulic control system of claim 12, wherein the first switching valve comprises:
a valve body comprising a first port receiving the control pressure of the second on/off solenoid valve, a second port receiving the reverse range pressure as its control pressure, a third port receiving the reverse range pressure, a fourth port supplying the hydraulic pressure supplied through the third port to the third switching valve, a fifth port exhausting the hydraulic pressure supplied through the fourth port, a sixth port receiving the forward range pressure, a seventh port supplying the hydraulic pressure supplied through the sixth port to the third clutch side hydraulic pressure control valve, and a eighth port exhausting the hydraulic pressure supplied through the seventh port; and
a valve spool comprising a first land receiving the control pressure supplied through the first port, a second land receiving the control pressure supplied through the second port, a third land, cooperatively with the second land, selectively enabling communication of the fourth and third ports or the fourth and fifth ports, a fourth land, cooperatively with the third land, selectively enabling communication of the seventh and sixth ports or the seventh and eighth ports,
wherein an elastic member is disposed between the fourth land and the valve body.

14. The hydraulic control system of claim 1, wherein the fourth clutch and first brake control portion comprises:
a fourth clutch side pressure control valve integrally formed with a fourth proportional control solenoid valve;
a fourth clutch side pressure switching valve controlling the hydraulic line according to the control pressure of the fourth proportional control solenoid valve and the control pressure of the first reducing valve;
a second switching valve controlling the hydraulic line and selectively supplying the hydraulic pressure supplied from the fourth proportional control solenoid valve to the fourth clutch and the first brake according to the control pressure of the first on/off solenoid valve; and
a third switching valve supplying the hydraulic pressure supplied from the first and second switching valves to the first brake according to the control pressure supplied from the first switching valve.

15. The hydraulic control system of claim 14, wherein the fourth clutch side pressure control valve integrally formed with the fourth proportional control solenoid valve comprises:
a valve body comprising a first port receiving the control pressure of the fourth proportional control solenoid valve, a second port receiving a forward range pressure from the manual valve, a third port supplying the hydraulic pressure supplied through the second port to the fourth clutch side pressure switching valve and the second switching valve, a fourth port exhausting the hydraulic pressure supplied through the third port, a fifth port partially receiving the hydraulic pressure supplied to the fourth clutch side pressure switching valve when the fourth proportional control solenoid valve is turned on; and
a valve spool comprising a first land receiving the control pressure supplied through the first port, a second land selectively closing the second port, and a third land, cooperatively with the second land, selectively enabling communication of the second and third ports,
wherein an elastic member is disposed between the third land and the valve body.

16. The hydraulic control system of claim 14, wherein the fourth clutch side pressure switching valve comprises:
a valve body comprising a first port receiving the control pressure of the first reducing valve, a second port formed at an opposite side of the first port and receiving the control pressure of the fourth proportional control solenoid valve, a third port partially receiving the hydraulic pressure supplied from the fourth clutch side pressure control valve to the second switching valve, a fourth port connected with the fifth port of the fourth clutch side pressure control valve, a fifth port selectively communicating with the fourth port and exhausting the hydraulic pressure of the fourth port, a sixth port receiving the control pressure from the fifth proportional control solenoid valve, and a seventh port selectively supplying the hydraulic pressure supplied through the sixth port to the fifth proportional control solenoid valve; and
a valve spool comprising a first land receiving the control pressure supplied through the first port and closing the sixth port, a second land, cooperatively with the first land, selectively enabling communication of the seventh and fifth ports or the seventh and sixth ports, and a third land selectively closing the third port and, cooperatively with the second land, selectively enabling communication of the fourth and fifth ports by the control pressure supplied through the second port,
wherein an elastic member is disposed between the third land and the valve body.

17. The hydraulic control system of claim 14, wherein the second switching valve supplies the forward range pressure to the fourth clutch or supplies the forward range pressure to the first brake through the third switching valve according to the control pressure of the first on/off solenoid valve.

18. The hydraulic control system of claim 17, wherein the second switching valve comprises:
a valve body comprising a first port receiving the control pressure of the first on/off solenoid valve, a second port receiving the forward range pressure from the fourth clutch side pressure control valve, a third port supplying the hydraulic pressure supplied through the second port to the fourth clutch, a fourth port supplying the hydraulic pressure supplied through the second port to the third switching valve, a fifth port exhausting the hydraulic pressure supplied through the third port, a sixth port exhausting the hydraulic pressure supplied to the fourth port, and a seventh port partially receiving the hydraulic pressure supplied to the third port;
a valve spool comprising a first land receiving the control pressure supplied through the first port, a second land, cooperatively with the first land, selectively enabling communication of the fourth and second ports or the fourth and sixth ports, and a third land, cooperatively with the second land, selectively enabling communication of the third and second ports or the third and fifth ports,
wherein an elastic member is disposed between the third land and the valve body.

19. The hydraulic control system of claim 14, wherein the third switching valve comprises:
a valve body comprising a first port receiving the reverse range pressure from the first switching valve as its control pressure, a second port receiving the forward range pressure from the second switching valve, a third port receiving the reverse range pressure from the first switching valve, and a fourth port supplying the hydraulic pressure supplied from the second and third ports to the first brake; and a valve spool comprising a first land receiving the control pressure supplied through the first port, and a second land, cooperatively with the first land, selectively enabling communication of the fourth and second ports or the fourth and third ports, wherein an elastic member is disposed between the second land and the valve body.

20. The hydraulic control system of claim 1, wherein the second brake control portion comprises:

a second brake side pressure control valve integrally formed with a fifth proportional control solenoid valve; and a second brake side pressure switching valve controlling the hydraulic line according to the control pressure of the fifth proportional control solenoid valve and the control pressure of the first reducing valve.

21. The hydraulic control system of claim 20, wherein the second brake side pressure control valve integrally formed with the fifth proportional control solenoid valve comprises:

a valve body comprising a first port receiving the control pressure of the fifth proportional control solenoid valve, a second port receiving the hydraulic pressure from the third clutch side pressure switching valve, a third port receiving the forward range pressure from the third clutch side pressure switching valve, a fourth port supplying the hydraulic pressure supplied through the third port to the second brake, a fifth port exhausting the hydraulic pressure supplied to the fourth port, and a sixth port partially supplying the hydraulic pressure supplied to the second brake when the fifth proportional control solenoid valve is turned off; and a valve spool comprising a first land receiving the control pressure supplied through the first port, a second land receiving the control pressure supplied through the second port, a third land, cooperatively with the second land, selectively enabling communication of the fourth and third ports or the fourth and fifth ports, wherein an elastic member is disposed between the third land and the valve body.

22. The hydraulic control system of claim 20, wherein the second brake side pressure switching valve comprises:

a valve body comprising a first port receiving the control pressure of the first reducing valve, a second port formed with an opposite side of the first port and receiving the control pressure of the fifth proportional control solenoid valve, a third port partially receiving the hydraulic pressure supplied from the second brake side pressure control valve to the second brake, a fourth port connected to the sixth port of the second brake side pressure control valve, a fifth port selectively communicating with the fourth port and exhausting the hydraulic pressure of the fourth port, a sixth port receiving the line pressure from a line pressure line, a seventh port selectively supplying the line pressure of the sixth port to the first switching valve, and an eighth port selectively communicating with the seventh port and exhausting the hydraulic pressure of the seventh port; and a valve spool comprising a first land receiving the control pressure supplied through the first port and closing the eighth port, a second land, cooperatively with the first land, selectively enabling communication of the seventh and sixth ports or the seventh and eighth ports, and a third land, cooperatively with the second land, selectively closing the third port and selectively enabling communication of the fourth and third ports or the fourth and fifth ports by the control pressure of the second port, wherein an elastic member is disposed between the third land and the valve body.

* * * * *